(12) United States Patent
  Kang

(10) Patent No.: US 12,631,748 B2
(45) Date of Patent: May 19, 2026

(54) APPARATUS AND METHOD FOR MONITORING SURROUNDING ENVIRONMENT OF VEHICLE

(71) Applicant: HYUNDAI MOBIS CO., LTD., Seoul (KR)

(72) Inventor: Eun Seok Kang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 446 days.

(21) Appl. No.: 17/870,203

(22) Filed: Jul. 21, 2022

(65) Prior Publication Data

US 2023/0027766 A1      Jan. 26, 2023

(30) Foreign Application Priority Data

Jul. 21, 2021    (KR) ........................ 10-2021-0095586
Jul. 21, 2021    (KR) ........................ 10-2021-0095587
(Continued)

(51) Int. Cl.
  *G01S 13/931* (2020.01)
  *B60W 40/02* (2006.01)
(52) U.S. Cl.
  CPC ........... *G01S 13/931* (2013.01); *B60W 40/02* (2013.01); *B60W 2420/408* (2024.01); *G01S 2013/932* (2020.01)
(58) Field of Classification Search
  None
  See application file for complete search history.

(56) References Cited

U.S. PATENT DOCUMENTS

2015/0284010 A1    10/2015  Beardsley et al.
2019/0049580 A1    2/2019   Natroshvili et al.
(Continued)

FOREIGN PATENT DOCUMENTS

KR    10-2013-0130843 A    12/2013
WO    WO 2019/244060 A1    12/2019
(Continued)

OTHER PUBLICATIONS

Extended European Search Report Issued on Nov. 11, 2022, in counterpart European Patent Application No. 22184734.6 (8 Pages in English).
(Continued)

*Primary Examiner* — Resha Desai
*Assistant Examiner* — Brandon James Henson
(74) *Attorney, Agent, or Firm* — NSIP Law

(57)    ABSTRACT

An apparatus for monitoring the surrounding environment of a vehicle includes: a plurality of detection sensors to detect an object outside the vehicle according to a frame at a predefined period; and a controller to extract a stationary object from among objects detected by the detection sensors, to map the stationary object to a grid map, to calculate an occupancy probability parameter indicative of a probability that the stationary object will be located on a grid of the grid map, and to monitor the surrounding environment of the vehicle based on the occupancy probability parameter. The controller maps the stationary object to the grid map while updating the grid map by changing an index of each grid constituting the grid map according to behavior information of the vehicle.

16 Claims, 25 Drawing Sheets

(30)        Foreign Application Priority Data

Jul. 21, 2021    (KR) ........................ 10-2021-0095588
Jul. 21, 2021    (KR) ........................ 10-2021-0095591

(56)                References Cited

U.S. PATENT DOCUMENTS

| | | | | |
|---|---|---|---|---|
| 2019/0087667 | A1* | 3/2019 | Foroughi | ............... G06V 20/58 |
| 2019/0346854 | A1 | 11/2019 | Slutsky et al. | |
| 2020/0103523 | A1* | 4/2020 | Liu | ......................... G01S 13/87 |
| 2020/0158862 | A1* | 5/2020 | Mahmoud | ............. G01S 13/931 |

FOREIGN PATENT DOCUMENTS

| WO | WO 2020/154965 A1 | 8/2020 |
|---|---|---|
| WO | WO 2021/007561 A1 | 1/2021 |

OTHER PUBLICATIONS

Danescu, Radu, et al., "Modeling and Tracking the Driving Environment With a Particle-Based Occupancy Grid", IEEE Transactions on Intelligent Transportation Systems 12.4 (2011): 1331-1342.
European Office Action issued on Jul. 25, 2023, in counterpart European Patent Application No. 22 184 734.6 (7 pages).

\* cited by examiner

FIG. 2

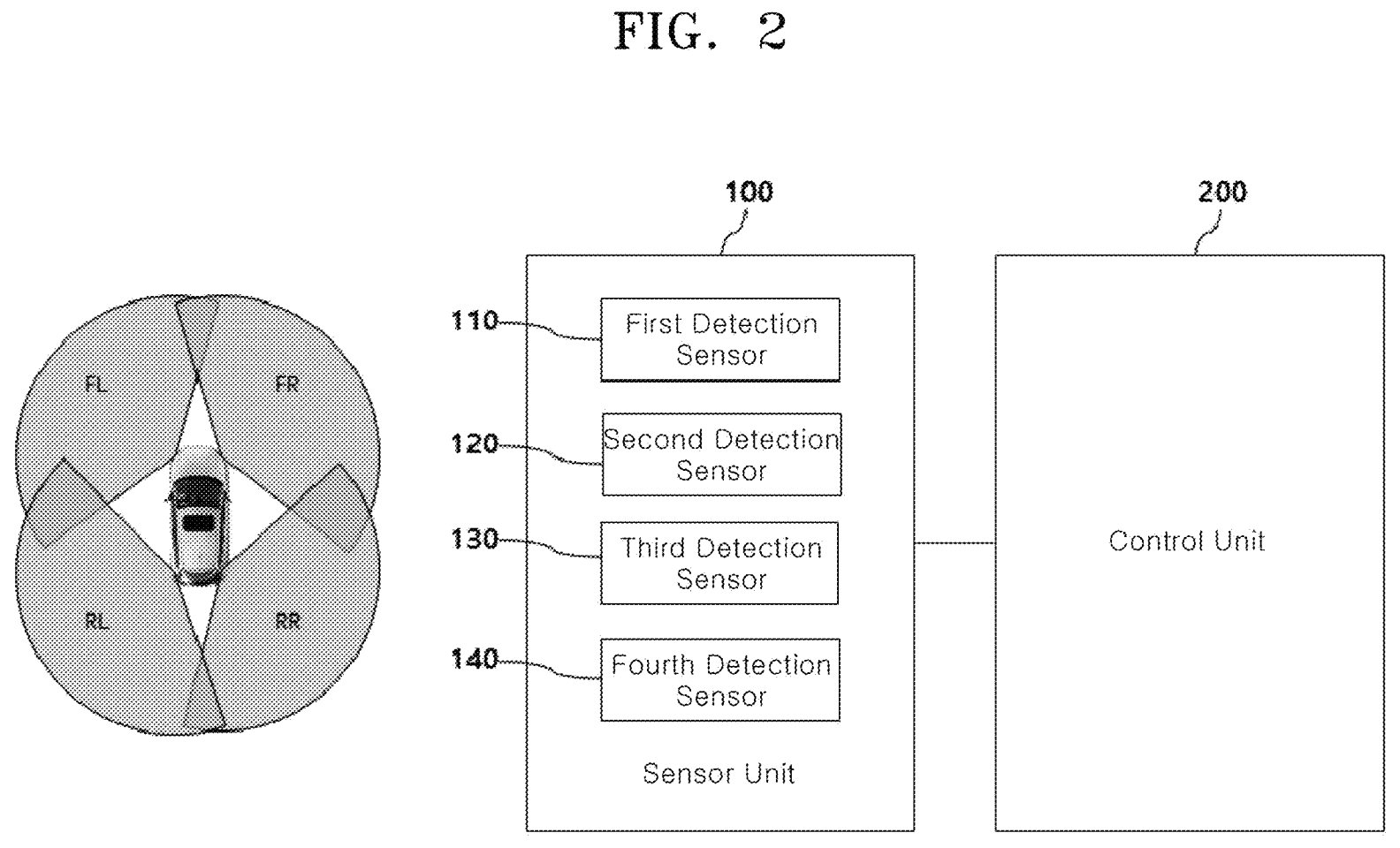

200 — Control Unit

100 — Sensor Unit

First Detection Sensor — 110

Second Detection Sensor — 120

Third Detection Sensor — 130

Fourth Detection Sensor — 140

K<sup>th</sup> Frame
(RR Radar)

(K+1)<sup>th</sup> Frame
(RR Radar)

FIG. 9A
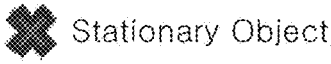 Stationary Object
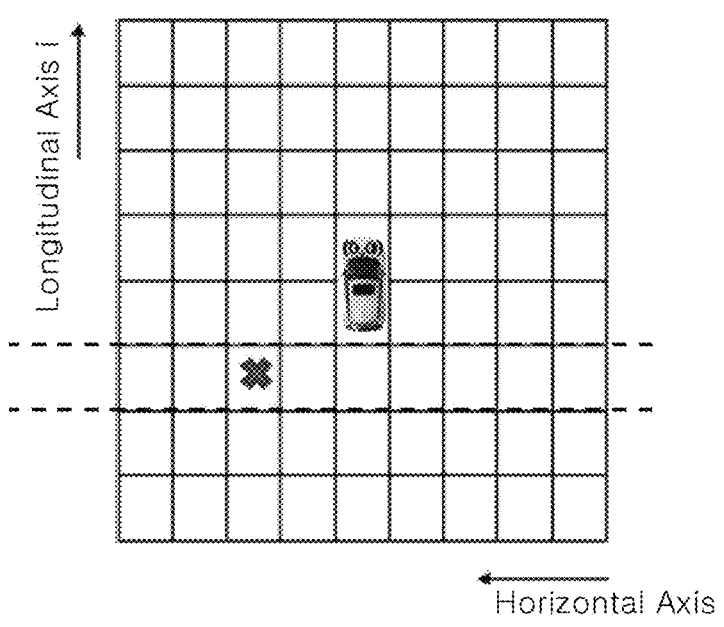
(K+1)$^{th}$ Frame $K^{th}$ Frame $K^{th}$ Frame Δθ(Yaw-Axis Angle Change)

FIG. 11
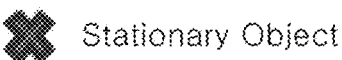 Stationary Object
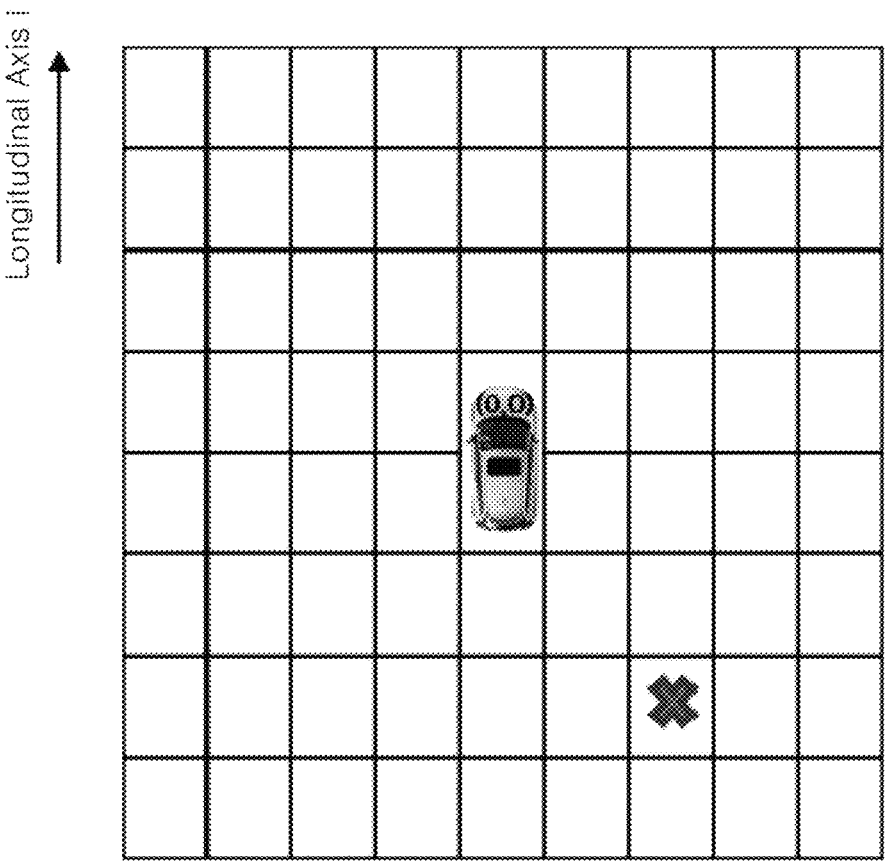

Expanded Mapping Area

FIG. 14

| Waveform Type | Detection Probability | Occupancy Probability Parameter in Grid Map | Mapping Index for Frame | | |
|---|---|---|---|---|---|
| | | | $(K-2)^{th}$ Frame | $(K-1)^{th}$ Frame | $K^{th}$ Frame |
| Multiple Waveforms 3(= Nwave) | $P_d$ | ① Mapping Area Expansion  ② Occupancy Probability Parameter | $[i-2\sim i+1, j-1\sim j+1]$ | $[i-1\sim i+1, j-1\sim j+1]$ | $[i\sim i+2, j-1\sim j+1]$  Different indexes are mapped to respective frames, but expanded mapping area is set |

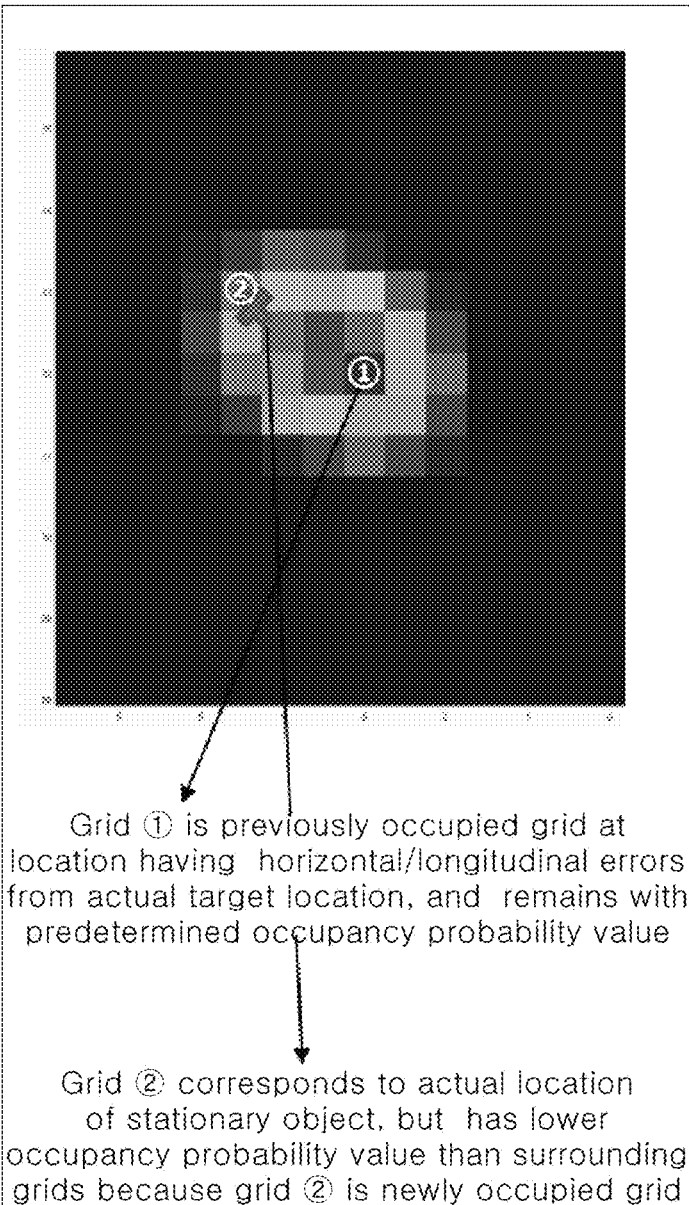

Grid ① is previously occupied grid at location having horizontal/longitudinal errors from actual target location, and remains with predetermined occupancy probability value Grid ② corresponds to actual location of stationary object, but has lower occupancy probability value than surrounding grids because grid ② is newly occupied grid Before update error correction Grid ① is previously occupied grid, and has low occupancy probability value through resetting Grid ② corresponds to actual location of stationary object, and has high occupancy probability value because grid ② inherits occupancy probability value of surrounding grid After update error correction

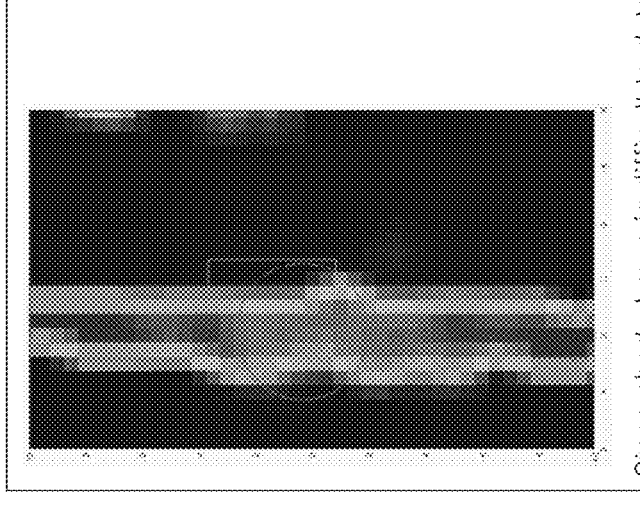

Since shaded area is difficult to detect through radar, but continuously retains occupancy probability parameter accumulated in previous frames. shaded area has similar occupancy probability parameter to adjacent areas After shaded area correction

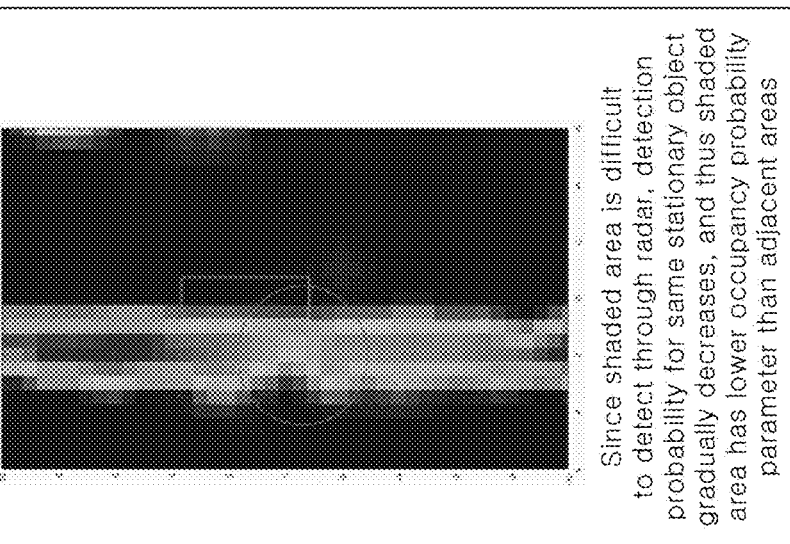

Since shaded area is difficult to detect through radar, detection probability for same stationary object gradually decreases, and thus shaded area has lower occupancy probability parameter than adjacent areas Before shaded area correction

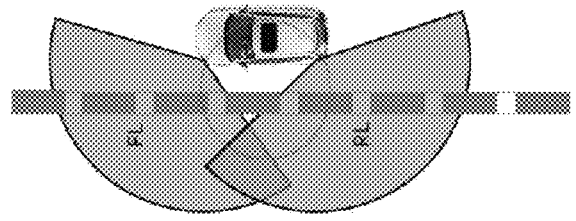

FIG. 21

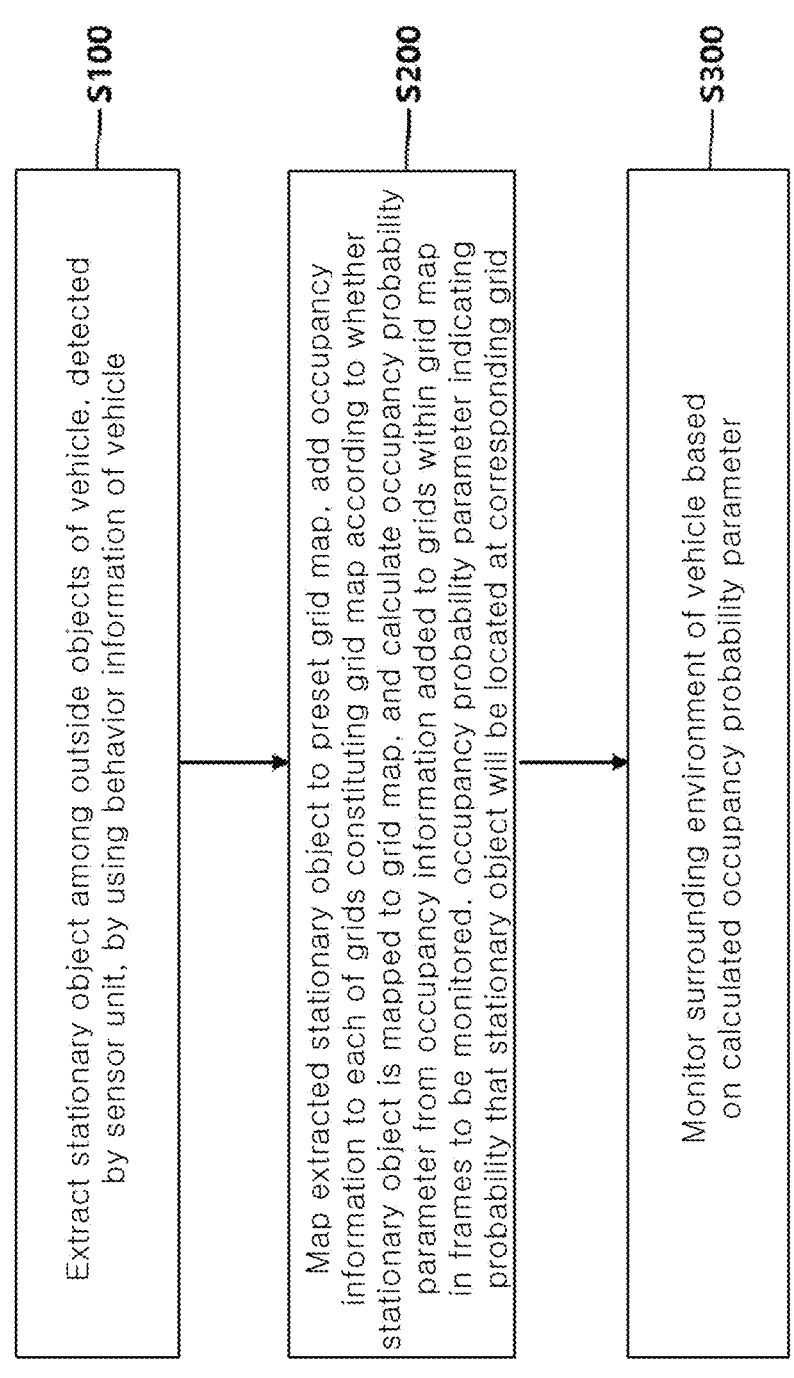

S100

Extract stationary object among outside objects of vehicle, detected by sensor unit, by using behavior information of vehicle

S200

Map extracted stationary object to preset grid map, add occupancy information to each of grids constituting grid map according to whether stationary object is mapped to grid map, and calculate occupancy probability parameter from occupancy information added to grids within grid map in frames to be monitored, occupancy probability parameter indicating probability that stationary object will be located at corresponding grid

S300

Monitor surrounding environment of vehicle based on calculated occupancy probability parameter

APPARATUS AND METHOD FOR MONITORING SURROUNDING ENVIRONMENT OF VEHICLE

CROSS-REFERENCE TO RELATED APPLICATION

This application claims priority from and the benefit of Korean Patent Application Nos. 10-2021-0095586, 10-2021-0095587, 10-2021-0095588, and 10-2021-0095591, filed on Jul. 21, 2021, which are hereby incorporated by reference for all purposes as if set forth herein.

BACKGROUND

Field

Exemplary embodiments of the present disclosure relate to an apparatus and method for monitoring the surrounding environment of a vehicle, and more particularly, to an apparatus and method for monitoring the surrounding environment of a vehicle by using an OGM (Occupancy Grid Map).

Discussion of the Background

A radar for a vehicle refers to a device that detects an outside object within a detection area when the vehicle travels, and warns a driver to help the driver to safely drive the vehicle. FIGS. 1A and 1B illustrate areas to which general radars for a vehicle transmit radar signals to detect an outside object. The radar for a vehicle operates to transmit a radar signal according to a frame with a predefined period, and detect an outside object. As illustrated in FIG. 1B, the signal characteristics of the transmitted radar signal, such as a waveform, frequency, distance resolution, angle resolution, maximum sensing distance, and FoV (Field of View), are different depending on a system of the vehicle, to which the radar is applied. Examples of the system include a DAS (Driver Assistance System) such as BSD (Blind Spot Detection), LCA (Lane Change Assistance), or RCTA (Rear Cross Traffic Alert).

The related art of the present disclosure is disclosed in Korean Patent Application Laid-Open No. 10-2013-0130843 published on Dec. 2, 2013.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Various embodiments are directed to an apparatus and method for monitoring the surrounding environment of a vehicle, which can improve detection accuracy for an outside object when monitoring the surrounding environment of the vehicle through a radar.

In one general aspect, an apparatus for monitoring a surrounding environment of a vehicle includes a plurality of detection sensors configured to detect an object outside the vehicle according to a frame at a predefined period; and a controller configured to extract a stationary object from among objects detected by the detection sensors, to map the stationary object to a grid map, to calculate an occupancy probability parameter indicative of a probability that the stationary object will be located on a grid of the grid map, and to monitor the surrounding environment of the vehicle based on the occupancy probability parameter. The controller is configured to map the stationary object to the grid map while updating the grid map by changing an index of each grid constituting the grid map according to behavior information of the vehicle.

The control unit may update the grid map from a $(K-1)^{th}$ frame to a $K^{th}$ frame when a grid map update condition is satisfied according to a longitudinal movement distance or a transverse movement distance of the vehicle.

The grid map update condition may be a condition in which the longitudinal movement distance of the vehicle is greater than a longitudinal size of the grid or the transverse movement distance of the vehicle is greater than a transverse size of the grid.

The control unit may update the grid map by changing the index of each grid in the $(K-1)^{th}$ frame with respect to the $K^{th}$ frame based on the longitudinal movement distance, the transverse movement distance, and a longitudinal angle change of the vehicle.

The control unit may update the grid map using a rotation matrix that rotates the grid map according to the longitudinal movement distance and the transverse movement distance of the vehicle from the $(K-1)^{th}$ frame to the $K^{th}$ frame, the index of each grid in the $(K-1)^{th}$ frame, and a yaw rate of the vehicle.

The control unit may convert location information of the stationary object into an index corresponding to the grid map, and map the stationary object to the grid map by specifying a target grid of the grid map corresponding to the index.

The control unit may add occupancy information with a first value to the target grid to which the stationary object is mapped, and add occupancy information with a second value to the remaining grids, the second value being smaller than the first value.

The control unit may determine an expanded mapping area expanded by a set range with respect to the target grid to which the stationary object is mapped, and monitor the surrounding environment of the vehicle by adding the occupation information with the first value to each grid constituting the expanded mapping area to calculate the occupation probability parameter.

The set range may be defined according to distance and speed resolutions of signal waveforms transmitted from the detection sensors.

The control unit may update the grid map according to whether a grid map update condition is satisfied when switching from a $(K-1)^{th}$ frame to a $K^{th}$ frame, while correcting a grid map update error due to an error inherent in a factor for determining whether the grid map update condition is satisfied.

When the grid map update error is corrected as the grid map is updated by switching from the $(K-1)^{th}$ frame to the $K^{th}$ frame, the control unit may compare a first expanded mapping area extended by a set range with respect to the target grid to which the stationary object is mapped in the $(K-1)^{th}$ frame with a second expanded mapping area extended by a set range with respect to the target grid to which the stationary object is mapped in the $K^{th}$ frame to correct an occupancy probability parameter of each grid constituting the second expanded mapping area.

The control unit may specify a first area composed of grids with increased occupancy probability parameters, among the grids of the second expanded mapping area, with respect to the $K^{th}$ frame compared to the $(K-1)^{th}$ frame, specify a second area composed of grids with decreased occupancy probability parameters, among the grids of the first expanded mapping area, and replace the occupancy probability parameters of the second area with the occupation probability parameters of the first area to correct the occupancy probability parameter of each of the grids constituting the second expanded mapping area.

The control unit may determine a peak grid with a maximum occupancy probability parameter among the grids in the grid map, and determine that the stationary object is located on the peak grid when the occupancy probability parameter of the peak grid is equal to or greater than a threshold value defined for the peak grid.

In another general aspect, a method of monitoring a surrounding environment of a vehicle includes extracting, by a controller, a stationary object from among objects, outside the vehicle, detected by a plurality of detection sensors configured to detect the objects according to a frame at a predefined period; mapping, by the controller, the stationary object to a grid map and calculating, by the controller, an occupancy probability parameter indicative of a probability that the stationary object will be located on a grid of the grid map from a result of mapping; and monitoring, by the controller, the surrounding environment of the vehicle based on the occupancy probability parameter. The grid map has a longitudinal axis, a transverse axis, and an index set with respect to the vehicle. In the calculating, by the controller, the occupancy probability parameter, the control unit maps the stationary object to the grid map while updating the grid map by changing an index of each grid constituting the grid map according to behavior information of the vehicle.

In another general aspect, an apparatus for monitoring a surrounding environment of a vehicle includes a sensor unit comprising a plurality of detection sensors configured to detect an object outside the vehicle according to a frame at a predefined period; and a controller configured to extract a stationary object from among the objects detected by the detection sensors, to map the stationary object to a grid map, to calculate an occupancy probability parameter indicative of a probability that the stationary object will be located on a grid of the grid map, and to monitor the surrounding environment of the vehicle by comparing the occupancy probability parameter with a threshold value defined in the grid of the grid map. The threshold value is defined for each of a plurality of areas in the grid map divided according to whether detection areas overlap each other in each frame for the same detection sensor and whether detection areas overlap each other in the same frame for two adjacent detection sensors.

The threshold value may be determined by a radar equation in response to strength of a received signal input to the sensor unit.

The plurality of areas may include an independent area, which has a first threshold value and is defined as an area in the grid map sensed by a first detection sensor in a $K^{th}$ frame (where K is a natural number).

The plurality of areas may include a single overlap area, which has a second threshold value and is defined as an area in the grid map in which an area sensed by the first detection sensor overlaps the independent area in a $(K+1)^{th}$ frame following the $K^{th}$ frame.

The plurality of areas may include a multiple overlap area, which has a third threshold value and is defined as an area in the grid map in which an area sensed by a second detection sensor adjacent to the first detection sensor overlaps the single overlap area in the $K^{th}$ frame or the $(K+1)^{th}$ frame.

Each of the first to third threshold values may have a linear section, which is a section that linearly increases in response to the strength of the received signal input to the sensor unit, and a relationship of "first threshold value<second threshold value<third threshold value" may be established in a section in which the respective linear sections of the first to third threshold values overlap each other.

In accordance with the embodiments of the present disclosure, the apparatus and method for monitoring the surrounding environment of a vehicle in accordance with the present embodiment may map a stationary object detected through the radar to the preset grid map, add occupancy information to each of the grids constituting the grid map depending on whether the stationary object is mapped to the grid map, and then calculate the occupancy probability parameter from the occupancy information added to each of the grids within the grid map in a plurality of frames to be monitored, the occupancy probability parameter indicating that the probability that the stationary object will be located at the corresponding grid, in order to monitor the surrounding environment of the vehicle. Thus, the apparatus and method can improve the detection accuracy for the outside object when monitoring the surrounding environment of the vehicle through the radar.

Other features and aspects will be apparent from the following detailed description, the drawings, and the claims.

BRIEF DESCRIPTION OF THE DRAWINGS

FIG. 2 is a block configuration diagram for describing an apparatus for monitoring the surrounding environment of a vehicle in accordance with an embodiment of the present disclosure.

FIGS. 4, 5, 6, 7, and 8 are diagrams illustrating a process of setting threshold values of the grid map in the apparatus for monitoring the surrounding environment of a vehicle in accordance with the embodiment of the present disclosure.

FIGS. 9A, 9B, 9C, and 10 are diagrams illustrating a process of updating the grid map in the apparatus for monitoring the surrounding environment of a vehicle in accordance with the embodiment of the present disclosure.

FIG. 11 is a diagram illustrating a process of mapping a stationary object to the grid map in the apparatus for monitoring the surrounding environment of a vehicle in accordance with the embodiment of the present disclosure.

FIGS. 12, 13, and 14 are diagrams illustrating a process of deciding an expanded mapping area in the apparatus for monitoring the surrounding environment of a vehicle in accordance with the embodiment of the present disclosure.

Figure 15:
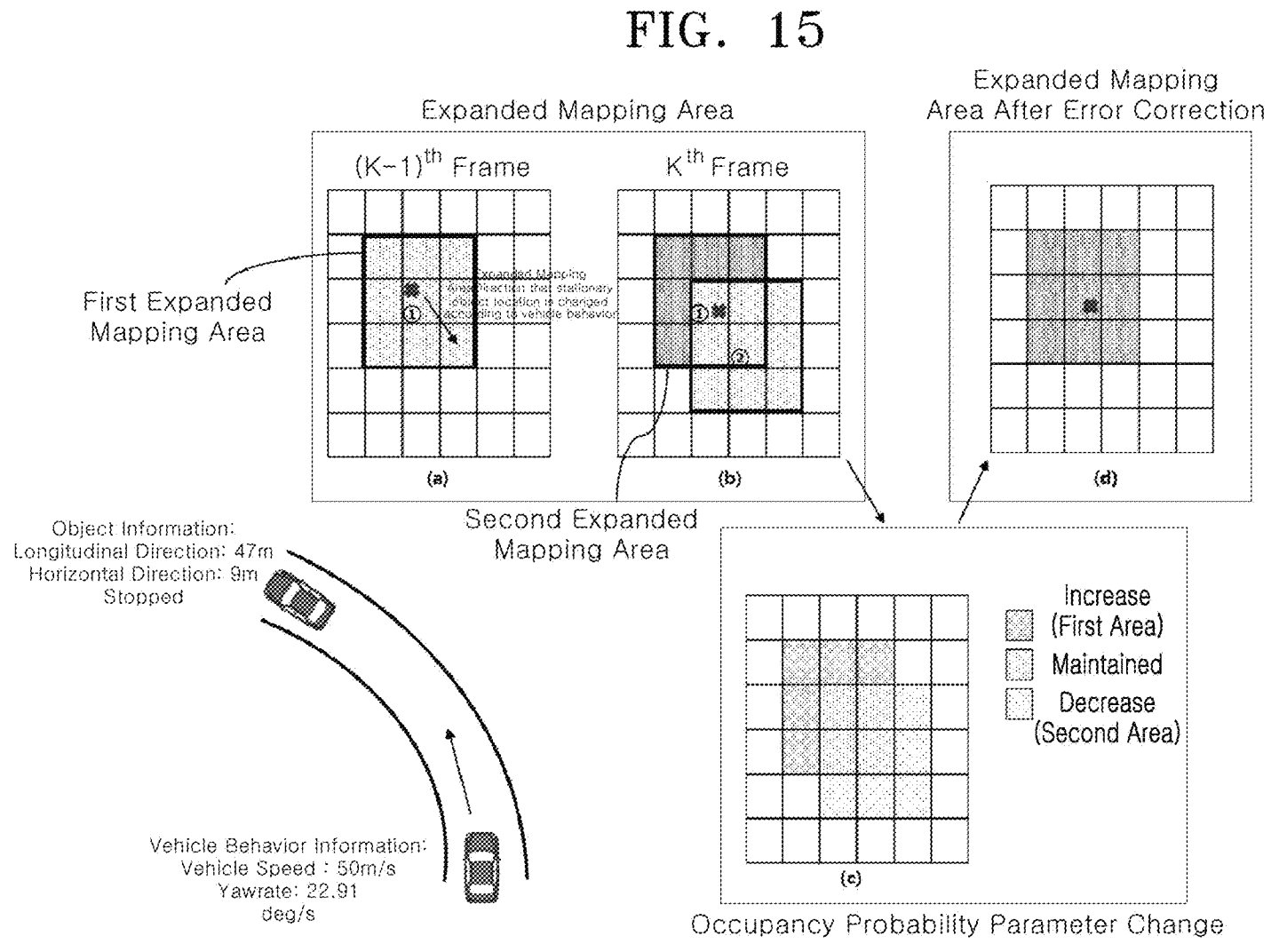

FIGS. 15, 16A, and 16B are diagrams illustrating a process of correcting an occupancy probability parameter in the apparatus for monitoring the surrounding environment of a vehicle in accordance with the embodiment of the present disclosure.

FIGS. 17, 18, 19, 20, and 21 are diagrams illustrating a process of correcting a shaded grid in the apparatus for monitoring the surrounding environment of a vehicle in accordance with the embodiment of the present disclosure.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third," A, B, C, (a), (b), (c), or the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Hereinafter, an apparatus and method for monitoring the surrounding environment of a vehicle will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 3:
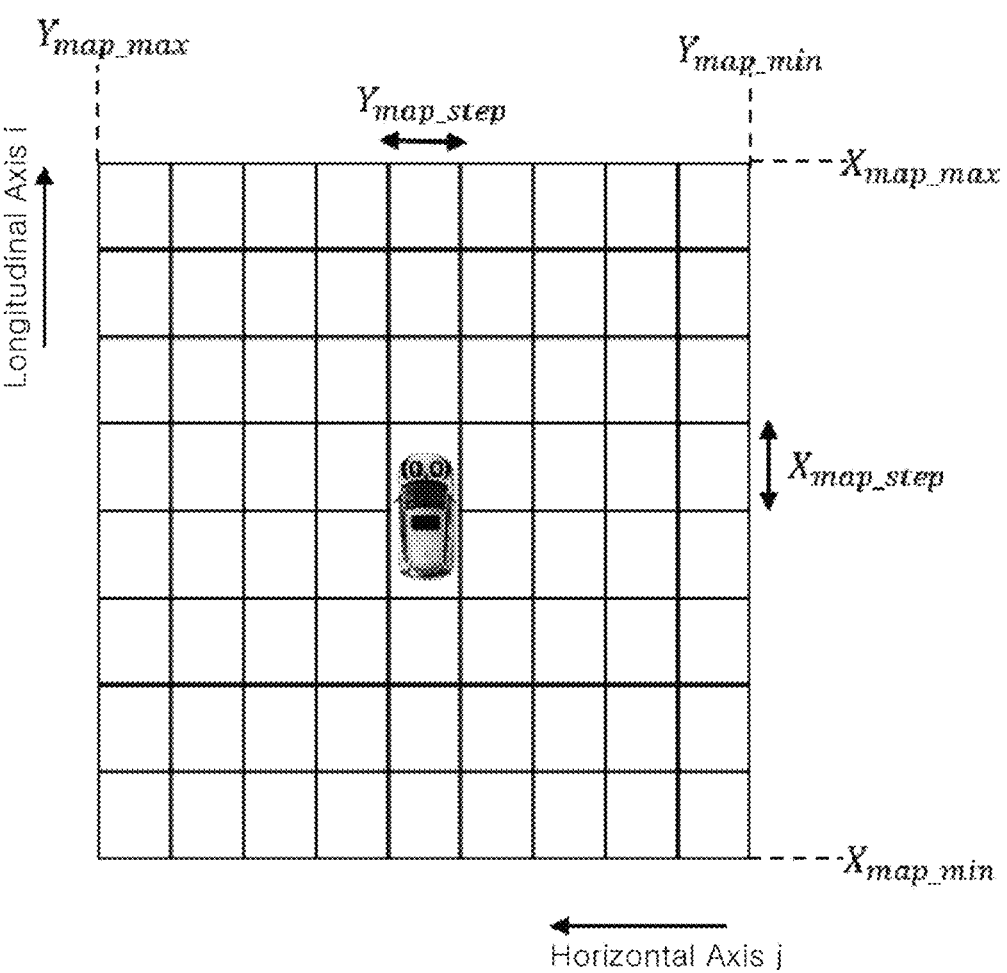
FIG. 3 is a diagram illustrating a grid map in the apparatus for monitoring the surrounding environment of a vehicle in accordance with the embodiment of the present disclosure.
Figure 9B:
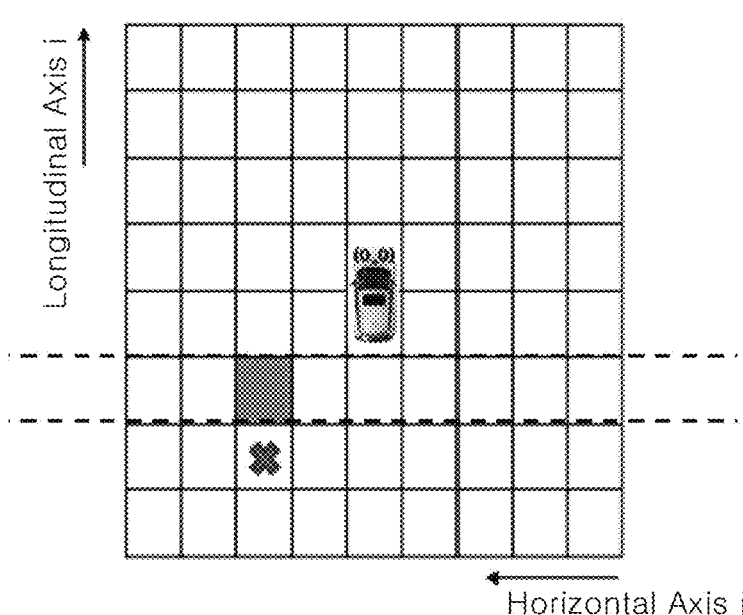
Figure 9C:
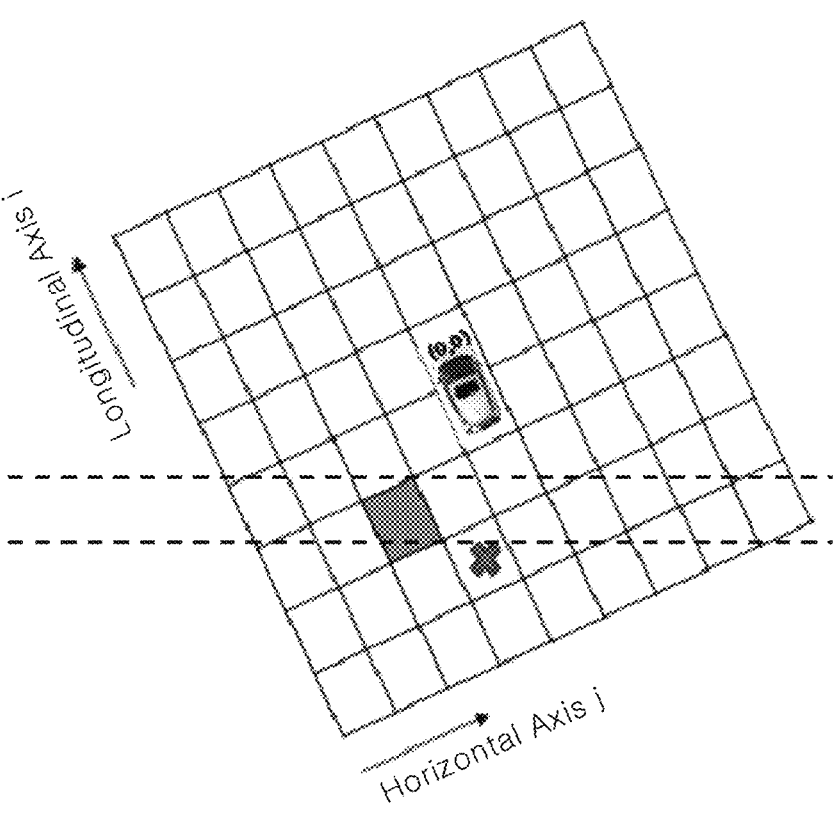
Figure 10:
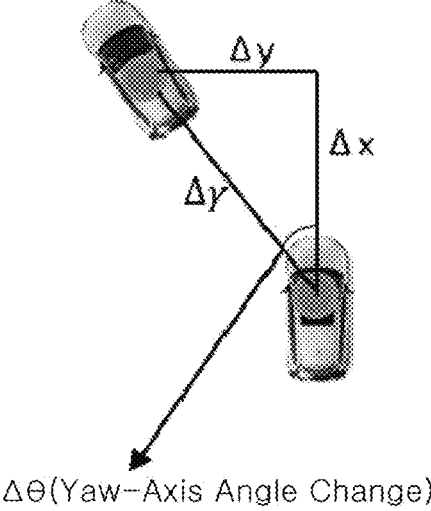
Figure 12:
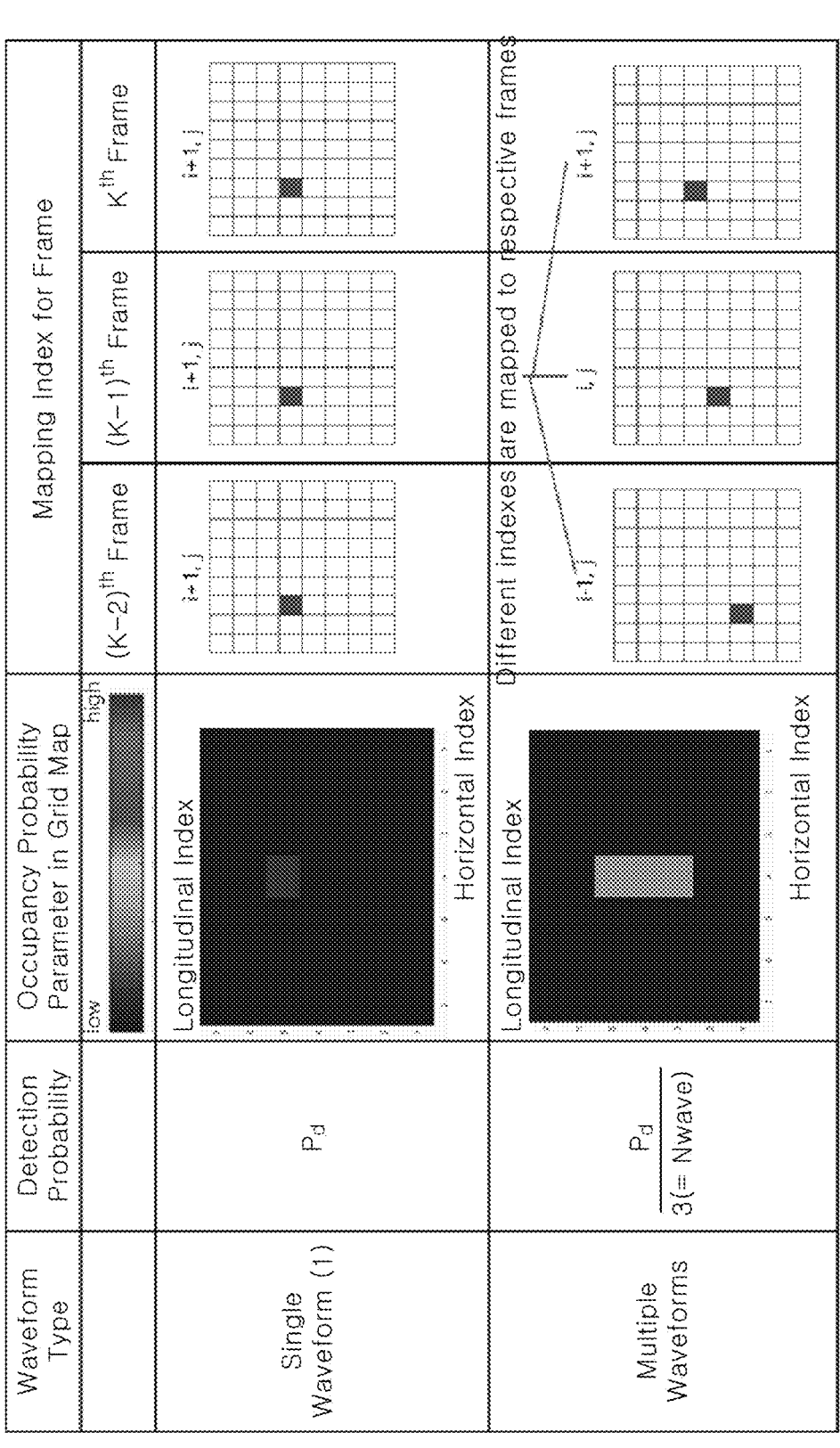
Figure 13:
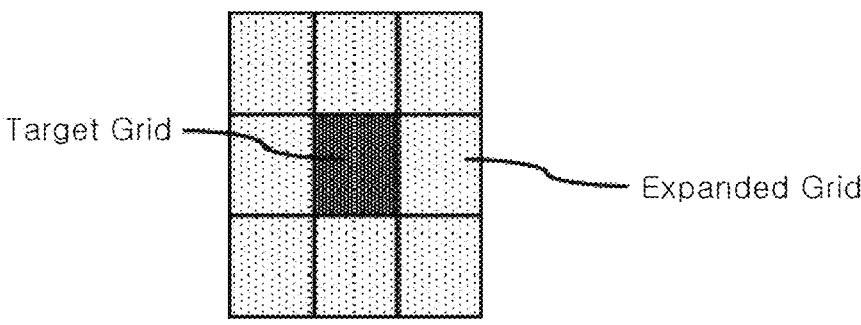

FIG. 2 is a block configuration diagram for describing an apparatus for monitoring the surrounding environment of a vehicle in accordance with an embodiment of the present disclosure, FIG. 3 is a diagram illustrating a grid map in the apparatus for monitoring the surrounding environment of a vehicle in accordance with the embodiment of the present disclosure, FIGS. 4 to 8 are diagrams illustrating a process of setting threshold values of the grid map in the apparatus for monitoring the surrounding environment of a vehicle in accordance with the embodiment of the present disclosure, FIGS. 9 and 10 are diagrams illustrating a process of updating the grid map in the apparatus for monitoring the surrounding environment of a vehicle in accordance with the embodiment of the present disclosure, FIG. 11 is a diagram illustrating a process of mapping a stationary object to the grid map in the apparatus for monitoring the surrounding environment of a vehicle in accordance with the embodiment of the present disclosure, FIGS. 12 to 14 are diagrams illustrating a process of deciding an expanded mapping area in the apparatus for monitoring the surrounding environment of a vehicle in accordance with the embodiment of the present disclosure, FIGS. 15 and 16 are diagrams illustrating a process of correcting an occupancy probability parameter in the apparatus for monitoring the surrounding environment of a vehicle in accordance with the embodiment of the present disclosure, and FIGS. 17 to 20 are diagrams illustrating a process of correcting a shaded grid in the apparatus for monitoring the surrounding environment of a vehicle in accordance with the embodiment of the present disclosure.

Referring to FIG. 2, the apparatus for monitoring the surrounding environment of a vehicle in accordance with the embodiment of the present disclosure may include a sensor unit 100 and a control unit 200.

Figure 1A:
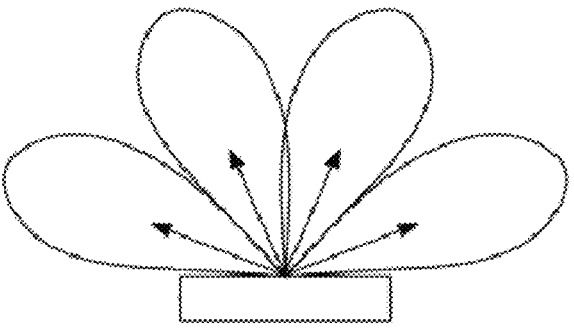
FIGS. 1A and 1B are diagrams illustrating areas to which general radars for a vehicle transmit radar signals to detect an outside object.
Figure 1B:
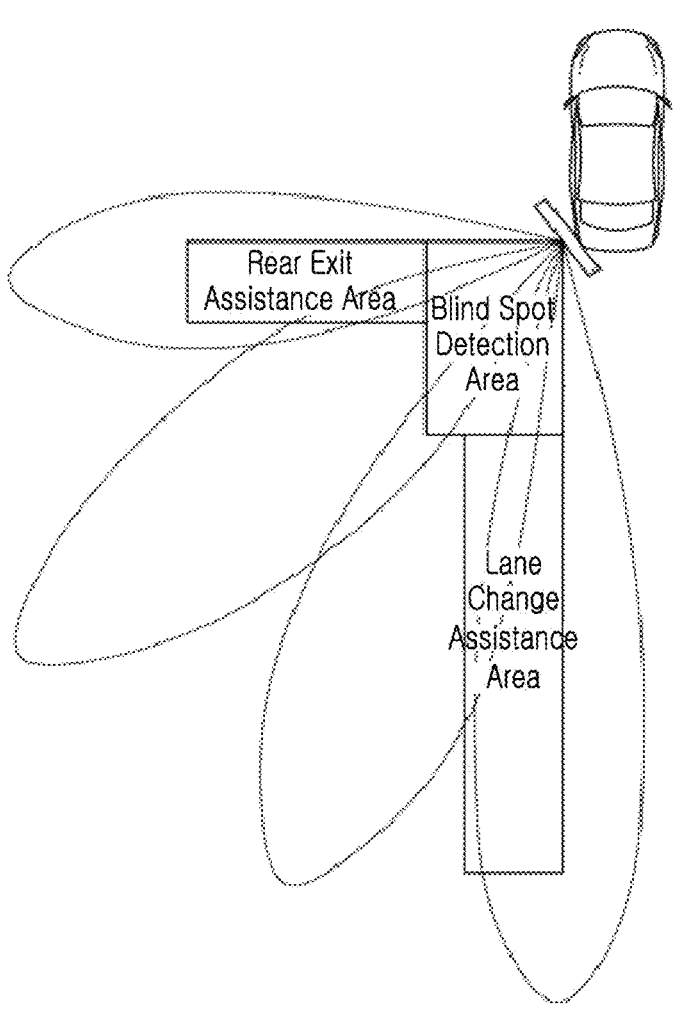

The sensor unit 100 may include first to fourth detection sensors 110, 120, 130, and 140 corresponding to radar sensors of the vehicle. As illustrated in FIG. 2, the first detection sensor 110 may correspond to a rear right (RR) radar sensor, the second detection sensor 120 may correspond to a rear left (RL) radar sensor, the third detection sensor 130 may correspond to a front right (FR) radar sensor, and the fourth detection sensor 140 may correspond to a front left (FL) radar sensor. Therefore, the detection sensors 110, 120, 130, and 140 may operate to detect an outside object through a method of transmitting a radar signal according to frames with a predefined period and receiving a signal reflected from the outside object. Furthermore, depending on a DAS (Driver Assistance System) (e.g. BSD, LCA or ROTA) to which a radar sensor is applied as illustrated in FIGS. 1A and 1B, the waveform, frequency, distance resolution, angle resolution, maximum sensing distance, and FoV of a radar signal transmitted from the radar sensor may have different characteristics for the respective frames.

The control unit 200 serves to monitor the surrounding environment of the vehicle by controlling an operation of the DAS of the vehicle, and may be implemented as an ECU (Electronic Control Unit), processor, CPU (Central Processing Unit) or SoC (System on Chip). The control unit 200 may drive an operating system or application to control a plurality of hardware components or software components connected to the control unit 200, and perform various data processing operations.

In the present embodiment, the control unit 200 may operate to extract a stationary object among outside objects detected by the sensor unit 100 by using behavior information of the vehicle, map the extracted stationary object to a preset grid map, and add occupancy information to each of grids constituting the grid map depending on whether the stationary object is mapped to the grid map. Furthermore, the control unit 200 may operate to calculate an occupancy probability parameter indicating the probability that the stationary object will be located at each of the grids, from the occupancy information added to the grids within the grid map in a plurality of frames to be monitored, and monitor the surrounding environment of the vehicle on the basis of the calculated occupancy probability parameter.

Hereafter, the process of monitoring the surrounding environment of the vehicle will be described in detail for each of the detailed operations of the control unit 200.

1. Stationary Object Extraction

First, the control unit 200 may extract a stationary object among outside objects detected by the sensor unit 100 by using behavior information of the vehicle and object information acquired on the basis of a result obtained by detecting the outside objects through the sensor unit 100. That is, the descriptions of the present embodiment will be focused on the configuration for monitoring a stationary object, not a moving object, among various outside objects around the vehicle.

The behavior information of the vehicle may include a vehicle speed, yaw rate, speed change information, and steering angle, and the object information may include the number of outside objects detected by the sensor unit 100, the longitudinal distance and horizontal distance to each of the objects, the longitudinal speed and horizontal speed of each of the objects, and the intensity of a received signal. The control unit 200 may extract only a stationary object among the outside objects by using the behavior information of the vehicle and the object information. For example, the control unit 200 may distinguish between a moving object and a stationary object by analyzing the relationships between the vehicle speed of the vehicle and the longitudinal/horizontal speeds of the objects, in order to extract only the stationary object.

2. Stationary Object Mapping

When the stationary object is extracted, the control unit 200 may map the extracted stationary object to the preset grid map. Before the mapping process for the stationary object, the grid map and an update process for the grid map will be preferentially described.

2-1. Grid Map

As illustrated in FIG. 3, the grid map may be set in the control unit 200 in advance, and have a size corresponding to the surrounding environment area of the vehicle, which is to be monitored. In FIG. 3, $X_{map\_max}$ represents the maximum distance in the longitudinal direction (the longitudinal size of the grid map), $Y_{map\_max}$ represents the maximum distance in the horizontal direction (the horizontal size of the grid map), $X_{map\_min}$ represents a longitudinal reference position of the grid map, $Y_{map\_min}$ represents a horizontal reference position of the grid map, $X_{map\_step}$ represents the longitudinal size of each grid, and $Y_{map\_step}$ represents the horizontal size of each grid.

The longitudinal and horizontal axes of the grid map may be set on the basis of the vehicle. If the longitudinal and horizontal axes of the grid map are set on the basis of a specific point, not the vehicle, more memory resources may be required depending on the mileage of the vehicle. Furthermore, it is effective to set, to the surrounding area of the vehicle, a surrounding environment monitoring area required for outputting a warning to a driver or performing a traveling control operation of the vehicle. Therefore, the longitudinal and horizontal axes of the grid map may be set on the basis of the vehicle. Thus, the indexes (coordinates (i, j)) of the grids constituting the grid map may also be set on the basis of the vehicle, where i and j represent the longitudinal and horizontal indexes, respectively.

Figure 4:
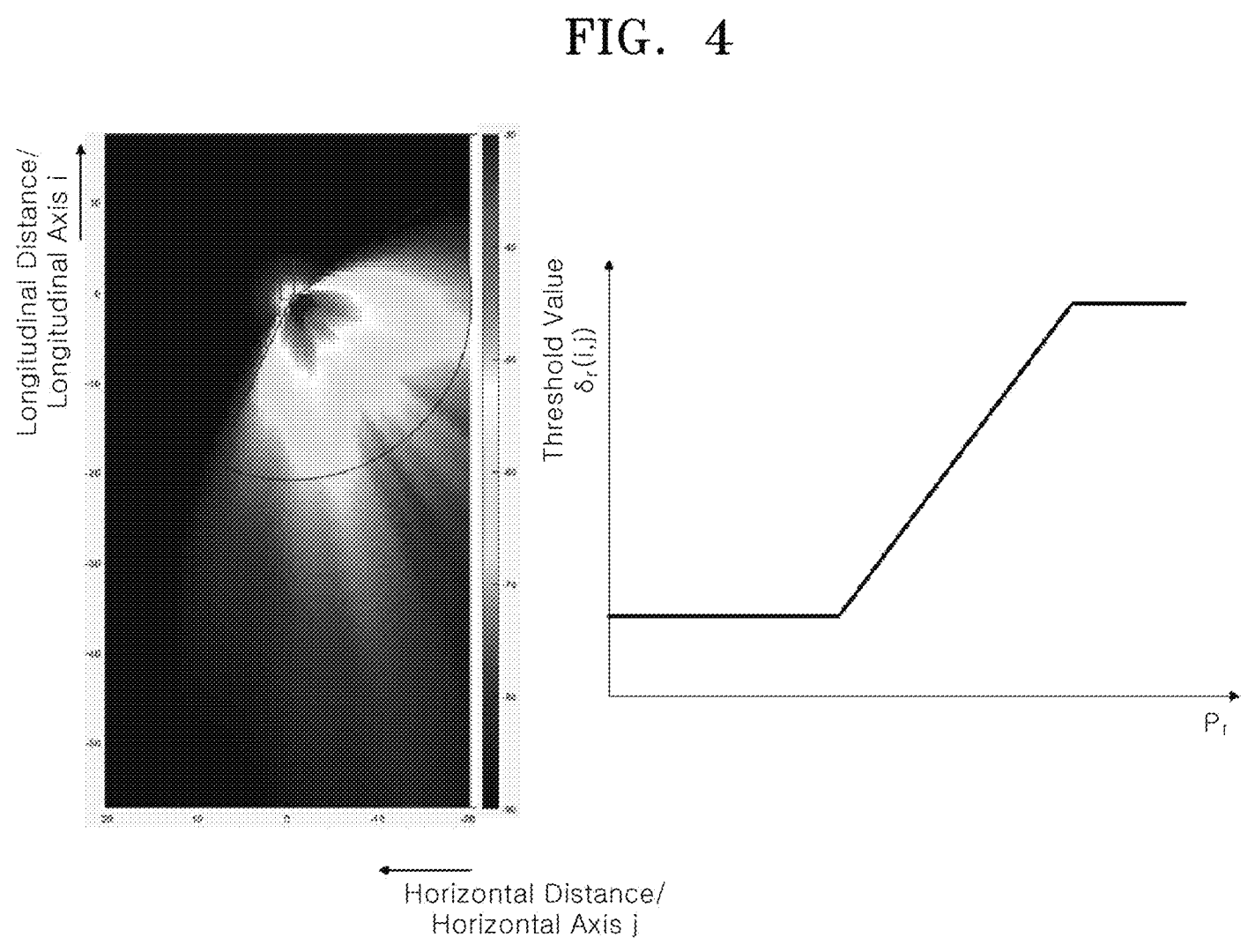

As illustrated in FIG. 4, a threshold value for deciding whether a stationary object occupies each of the grids within the grid map may be defined for the corresponding grid in the grid map. As will be described below, the threshold value functions as a value which is compared to an occupancy probability parameter, and serves as a reference value for determining whether the stationary object is located at the corresponding grid. The threshold value may be defined for each of the grids on the basis of a mathematical model according to the intensity of a received signal inputted to the sensor unit 100, and the mathematical model may correspond to a well-known radar equation below, where Pr represents the intensity of the received signal, Gt represents an antenna gain, and Rt represents the distance to the object:

$$P_r \propto G_{t,r}(\theta) \cdot \frac{1}{R_t^4}.$$

Specifically, according to the radar equation, the intensity of the received signal may differ depending on the antenna gain and the relative distance to the object. Therefore, the probability that the same object will be detected through the radar may differ depending on the location thereof. For example, when an object is located at a short distance, the intensity of a received signal is so high that the object detection probability increases, and when an object is located at a long distance, the intensity of a received signal is so low that the object detection probability decreases.

Furthermore, when an object is located at a location where the antenna gain is high, the intensity of a received signal is so high that the object detection probability increases, and when an object is located at a location where the antenna gain is low, the intensity of a received signal is so low that the object sensing detection decreases. As described above, the waveform, frequency, distance resolution, angle resolution, maximum sensing distance, and FoV of a radar signal transmitted from the radar may have different characteristics for the respective frames, depending on the DAS (e.g. BSD, LCA or ROTA) of the vehicle, to which the radar sensor is applied. Thus, each of the frames may include an area where an object can be repeatedly detected, and only a specific frame may include an area where an object can be detected. Therefore, the area which is repeated in each of the frames may have a high object detection probability, and the area which is not repeated in each of the frames may have a low object detection probability. That is because, during two frames, an object can be detected twice in an area which is repeated, but an object can be detected only once in an area which is not repeated.

Furthermore, for two adjacent radar sensors, for example, the RR radar sensor and the RL radar sensor, there may be an area where an object can be redundantly detected through the two radar sensors, and an area where an object can be detected only through one radar sensor. Therefore, the area where the object can be redundantly detected through the two radar sensors may have a high object detection probability, and the area where the object can be detected only through one radar sensor may have a low object detection probability. That is because, although one radar sensor does not detect the object in the area where the object can be redundantly detected through the two radar sensors, the object can be detected through the other adjacent radar sensor, but when one radar sensor does not detect the object in the area where the object can be detected only through one radar sensor, the object cannot be detected through the other adjacent radar sensor.

Through the above-described contents, two situations may be considered.

i) Case in which the object detection probability is the highest: an 'area where an object is located at a short distance and the antenna gain is high', a 'detection area repeated in each frame', and a 'detection area redundant between the adjacent radar sensors' i) Case in which the object detection probability is the lowest: an 'area where an object is located at a long distance and the antenna gain is low, a 'detection area which is not repeated in each frame', and a 'detection area which is not redundant between the adjacent radar sensors'

It may be unreasonable to set the same threshold value to all the grids, in order to decide whether a stationary object occupies each of the grids within the grid map, in the two above cases. That is because, in case (i), it may be falsely determined that an object is present, even though no object is actually present (false detection), and in case (ii), it may be falsely determined that no object is present, even though an object is actually present (missing detection). Thus, in the present embodiment, the threshold values for the respective grids may be differently set depending on the object detection probability, which makes it possible to prevent the false determination (false detection and missing detection).

Specifically, the threshold value may be set to different values for an independent area, a single-overlap area, and a multi-overlap area within the grid map.

Figure 5:
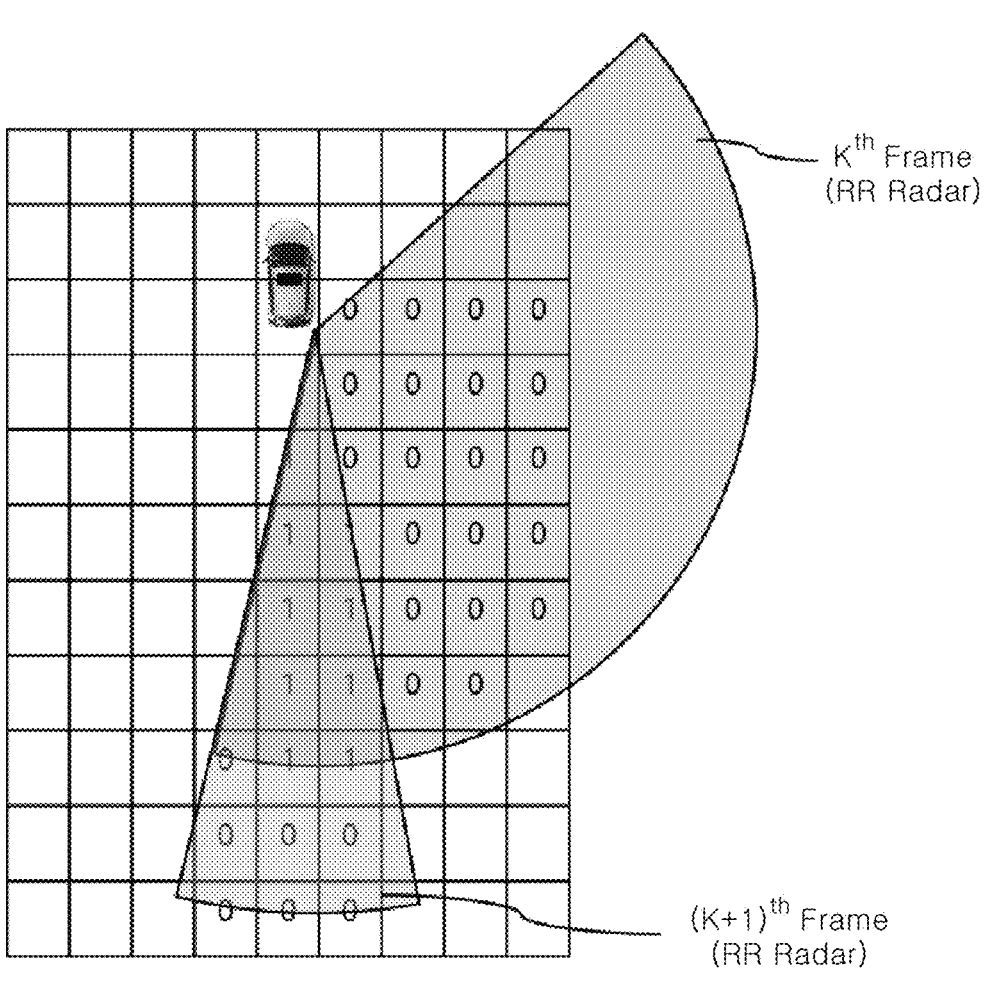

The independent area may be defined as an area within the grid map, which is sensed by the first detection sensor 110 in a $K^{th}$ frame, where K is a natural number, and the single-overlap area may be defined as an area within the grid map, in which an independent area and an area sensed by the first detection sensor 110 overlap each other in a $(K+1)^{th}$ frame distinguished from the $K^{th}$ frame (following the $K^{th}$ frame). That is, the independent area and the single-overlap area are distinguished from each other, according to whether the detection areas overlap each other for the same detection sensor in the respective frames. In FIG. 5 in which the first detection sensor is the RR radar, the grid of the independent area is designated by '0', and the grid of the single-overlap area is designated by '1'. The threshold value of the grid of the independent area may be set to a lower value than that of the grid of the single-overlap area, which makes it possible to compensate for false detection and missing detection which may occur for an object located in the independent area.

Figure 6:
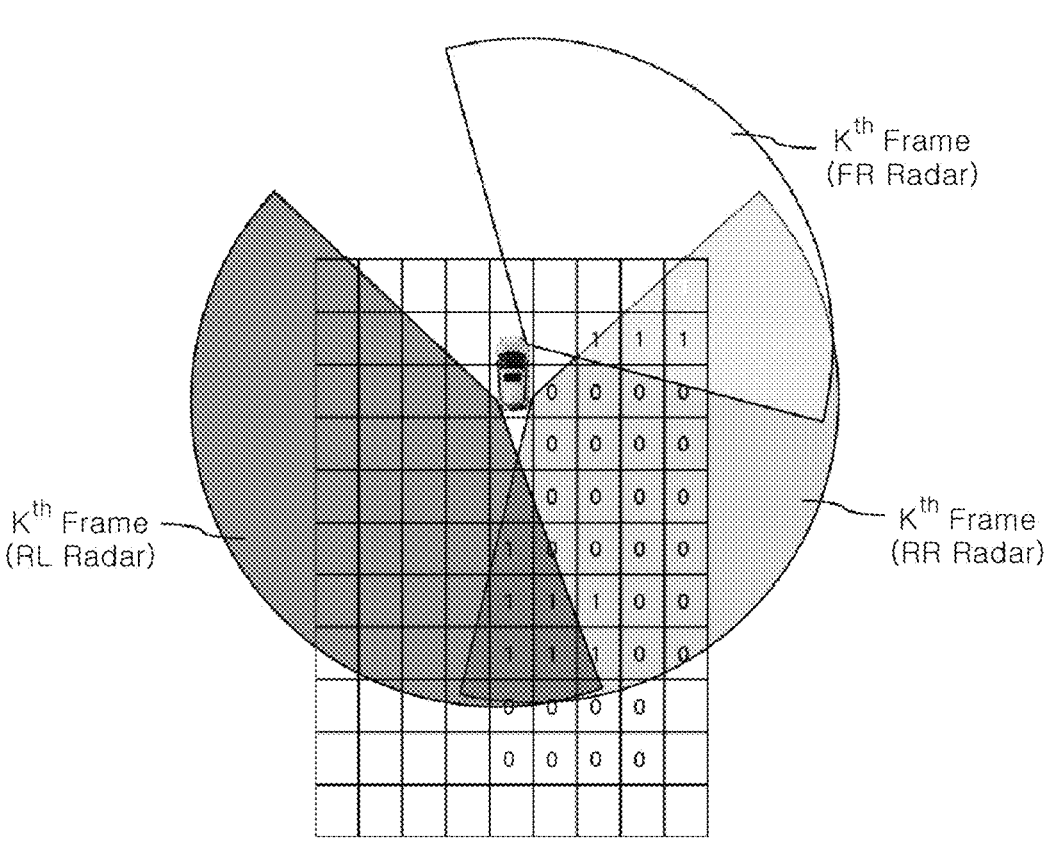
Figure 7:
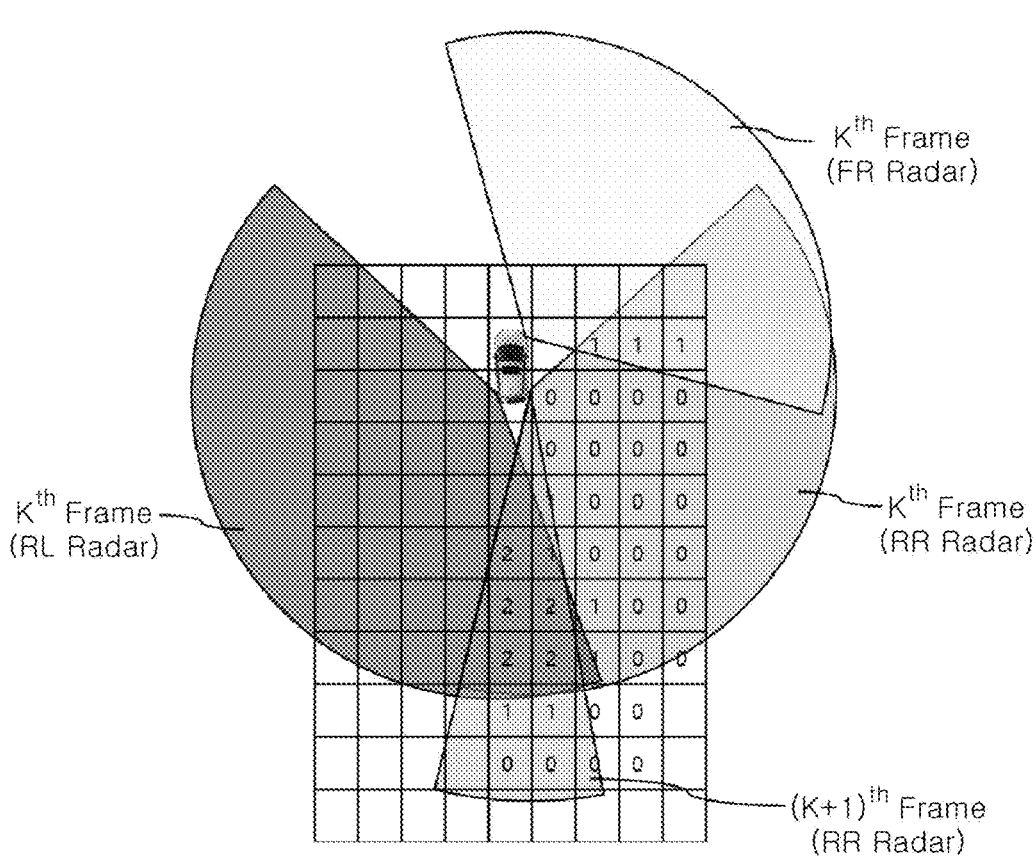
Figure 8:
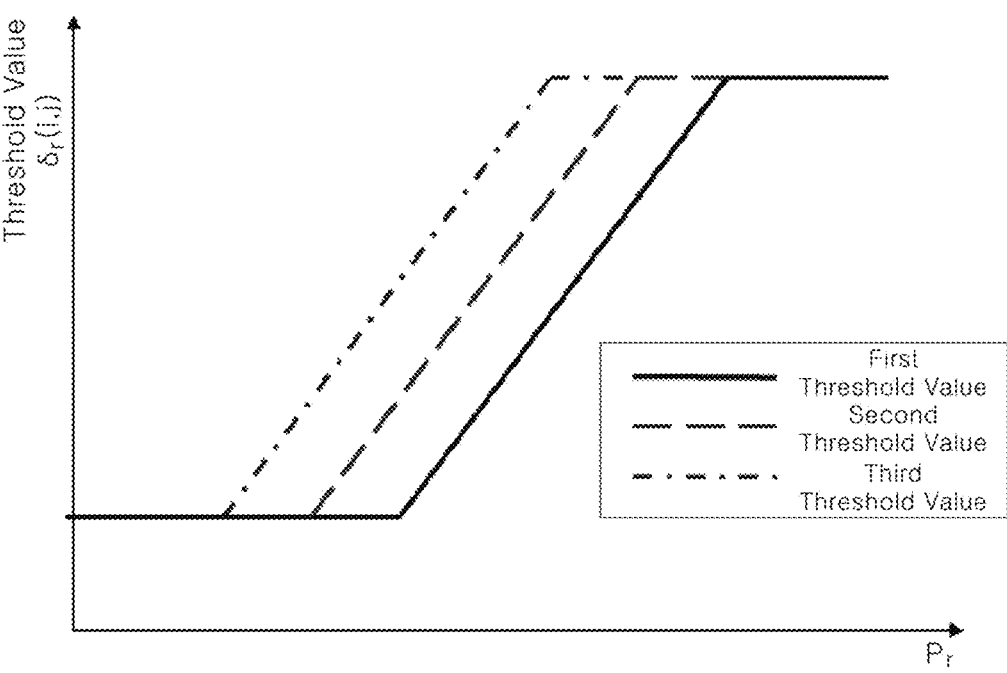

The multi-overlap area may be defined as an area within the grid map, in which an area sensed by the second detection sensor 120 adjacent to the first detection sensor 110 overlaps a single-overlap area in the same frame ($K^{th}$ or $(K+1)^{th}$ frame). That is, the multi-overlap area is decided according to whether areas detected by two adjacent detection sensors overlap each other in the same frame. In FIG. 6 in which the first detection sensor is the RR radar and the second detection sensor is the RL radar, the grid of an area sensed by the first detection sensor 110 is designated by '0', and the grid of the area where areas sensed by the first and second detection sensors 110 and 120 overlap each other is designated by '1'. Thus, as illustrated in FIG. 7 in which the first detection sensor is the RR radar and the second detection sensor is the RL radar, the grid map may be divided into the independent area '0' sensed by the first detection sensor 110 in the $K^{th}$ frame, the single-overlap area '1' which is an overlap area between the areas sensed by the first detection sensor 110 in the $K^{th}$ frame and the $(K+1)^{th}$ frame, and the multi-overlap area '2' which is an overlap area sensed by the first and second detection sensors 110 and 120 in the same frame and overlaps the single-overlap area. When the threshold values of the independent area, the single-overlap area, and the multi-overlap area are defined as a first threshold value, a second threshold value, and a third threshold value, respectively, a relationship of ' first threshold value<second threshold value<third threshold value' may be established in a section where the threshold values linearly increase as illustrated in FIG. 8.

2-2. Grid Map Update

As described above, since the longitudinal axis, horizontal index, and indexes of the grid map are set on the basis of the vehicle, the indexes of the grid map are changed by the behavior of the vehicle. Thus, a process of updating the grid map by changing the indexes of the grid map is needed in order to map a stationary object to the grid map. Furthermore, even after the stationary object is mapped to the grid map, the index of the grid to which the stationary object is mapped needs to be changed according to the behavior of the vehicle. When the grid map is updated after the stationary object is mapped to the grid map, the index of the grid to which the stationary object is mapped is also changed.

For this operation, the control unit 200 may update the grid map when a longitudinal moving distance of the vehicle is larger than the longitudinal size of the grid or a horizontal moving distance of the vehicle is larger than the horizontal size of the grid during a period from a $(K-1)^{th}$ frame to the $K^{th}$ frame. In this case, the control unit 200 may change the indexes of the respective grids in the $(K-1)^{th}$ frame from those in the $K^{th}$ frame, on the basis of the longitudinal moving distance, the horizontal moving distance, and a longitudinal angle change of the vehicle.

In order to take, as an example of a changed index, the index of a grid at which a stationary object is located, FIG. 9A illustrates the grid map in the $(K-1)^{th}$ frame with the index of the grid at which the stationary object is located. When the vehicle travels in the longitudinal direction by a distance larger than the longitudinal size of the grid as illustrated in FIG. 9B, the index of the stationary index on the grid map in the $(K-1)^{th}$ frame needs to be changed on the basis of the $K^{th}$ frame, because the index of the stationary object on the grid map in the $K^{th}$ frame is different from the index of the stationary object on the grid map in the $(K-1)^{th}$ frame. When the vehicle makes a turn according to a predetermined yaw rate as illustrated in FIG. 9C such that the longitudinal or horizontal moving distance of the vehicle becomes smaller than the longitudinal or horizontal size of the grid, the index of the stationary object on the grid map in the $(K-1)^{th}$ frame needs to be changed on the basis of the $K^{th}$ frame, because the index of the stationary object on the grid map in the $K^{th}$ frame is different from the index of the stationary object on the grid map in the $(K-1)^{th}$ frame. In this case, an angle change based on the yaw rate may be reflected into the update of the grid map.

The update process for the grid map based on FIGS. 9A to 9C will be described with reference to modeling of FIG. 10.

First, the control unit 200 calculates the accumulative values of yaw-axis angle changes and moving displacement changes of the vehicle during a period from the $(K-1)^{th}$ frame to the $K^{th}$ frame, according to Equation 1 below.

$$\Delta\theta\_acc = \Delta\theta\_acc + \Delta\theta \qquad\text{[Equation 1]}$$

$$\Delta\gamma = Vs * dt = |\Delta\gamma| \cdot \cos(\Delta\theta)\hat{\alpha}_x + |\Delta\gamma| \cdot |\sin(\Delta\theta)\hat{\alpha}_y$$

$$\Delta\gamma\_acc = \Delta\gamma\_acc + \Delta\gamma$$

In Equation 1, $\Delta\theta$ represents a yaw-axis reference instantaneous angle change of the vehicle, $\Delta\theta\_acc$ represents a yaw-axis reference accumulative angle change during the period from the $(K-1)^{th}$ frame to the $K^{th}$ frame, $\Delta_y$ represents an instantaneous moving displacement of the vehicle, Vs represents the speed of the vehicle, dt represents a time period from the $(K-1)^{th}$ frame to the $K^{th}$ frame, represents a longitudinal unit vector, represents a horizontal unit vector, and $\Delta_y$_acc represents an accumulative moving displacement of the vehicle during the period from the $(K-1)^{th}$ frame to the $K^{th}$ frame.

The control unit 200 determines whether a grid map update condition is satisfied, according to Equation 2 below.

$$\Delta x_k = -\Delta\gamma \cdot \cos(\Delta\theta) \qquad \text{[Equation 2]}$$

$$\Delta y_k = \Delta\gamma \cdot \sin(\Delta\theta)$$

$$\Delta x_k\_acc = \Delta x_k\_acc + \Delta x_k$$

$$\Delta y_k\_acc = \Delta y_k\_acc + \Delta y_k$$

$$if\ \left(\left|\Delta x_{k_{acc}}\right| > X_{map\_step}\right)\|\left(\left|\Delta y_{k_{acc}}\right| > Y_{map\_step}\right)$$

In Equation 2, $\Delta x_k$ represents a longitudinal instantaneous moving distance of the vehicle, $\Delta y_k$ represents a horizontal instantaneous moving distance of the vehicle, $\Delta x_k$ acc represents a longitudinal accumulative moving distance of the vehicle, and $\Delta y_k$ acc represents a horizontal accumulative moving distance of the vehicle.

When the grid map update condition is satisfied according to Equation 2, the control unit 200 updates the grid map according to Equation 3 below.

$$\begin{bmatrix} X_{map\_update}(i) \\ Y_{map\_update}(j) \end{bmatrix} = \qquad \text{[Equation 3]}$$

$$\begin{bmatrix} \cos(\Delta\theta_k) & \sin(\Delta\theta_k) \\ -\sin(\Delta\theta_k) & \cos(\Delta\theta_k) \end{bmatrix} \cdot \begin{bmatrix} X_{map}(i) \\ Y_{map}(j) \end{bmatrix} + \begin{bmatrix} \Delta x_{k\_acc} \\ \Delta y_{k\_acc} \end{bmatrix}$$

$$i\_update = floor\left(\frac{X_{map\_update}(i) - X_{map\_min}}{X_{map\_step}}\right) + 1$$

$$j\_update = floor\left(\frac{Y_{map_{update}}(j) - Y_{map\_min}}{Y_{map\_step}}\right) + 1$$

In Equation 3, (i, i) represents the index of a grid, (i update, j update) represents the index of an updated grid, and floor represents a truncation operator. In Equation 3, the matrix functions as a rotation matrix for rotating the grid map according to the yaw rate of the vehicle:

2-3. Stationary Object Mapping

The control unit 200 may convert the location information of a stationary object, i.e. the longitudinal distance and horizontal distance to the stationary object, into an index corresponding to the (updated) grid map, according to Equation 4 below.

$$I_{tgt\_n} = floor\left(\frac{X_{tgt\_n} - X_{map\_min}}{X_{map\_step}}\right) + 1 \qquad \text{[Equation 4]}$$

$$J_{tgt\_n} = floor\left(\frac{Y_{tgt\_n} - Y_{map\_min}}{Y_{map\_step}}\right) + 1$$

In Equation 4, $I_{tgt\_n}$ represents the longitudinal index of a target grid, $J_{tgt\_n}$ represents the horizontal index of the target grid, $X_{tgt\_n}$ represents the longitudinal distance to the stationary object, and $Y_{tgt\_n}$ represents the horizontal distance to the stationary object.

As illustrated in FIG. 11, the control unit 200 may map an extracted stationary object to the grid map by specifying a target grid of the grid map, corresponding to a changed index. In this case, the control unit 200 may add occupancy information having a first value to the target grid to which the stationary object is mapped, and add occupancy information having a second value to the other grids. In the present embodiment, the first value may be set to '1', and the second value may be set to '0'. Thus, the value '1' may be added as the occupancy information to the target grid to which the stationary object is mapped, and the value '0' may be added as the occupancy information to the other grids to which the stationary object is not mapped. Hereafter, the occupancy information added to an index (i, j) in the $K^{th}$ frame will be represented by Pmap (i, j, k).

3. Expanded Mapping Area Decision

As described above, the waveform, frequency, distance resolution, angle resolution, maximum sensing distance, and FoV of a radar signal transmitted from a radar sensor may have different characteristics for the respective frames, depending on the DAS (e.g. BSD, LCA or ROTA) of the vehicle, to which the radar sensor is applied. Therefore, although the same stationary object is detected, the index at which the stationary object is detected may be changed in each frame because the signal characteristics are different in each frame. In this case, an occupancy probability parameter to be described below may be reduced by the number of used signal waveforms. FIG. 12 illustrates results obtained when the radar sensor detects the same stationary object by transmitting radar signals with a single waveform and multiple waveforms. In the case of the multiple waveforms, grids occupied in the respective frames are distributed to reduce the probability that the stationary object will be detected, compared to the single waveform. When the threshold value of the grid map is set to a low value to compensate for the reduction in the occupancy probability parameter, the stationary object is highly likely to be falsely detected due to a clutter or noise.

In order to prevent the false detection, the control unit 200 in accordance with the present embodiment may add occupancy information to surrounding grids as well as the target grid corresponding to the detected stationary object. Specifically, as illustrated in FIG. 13, the control unit 200 may decide an expanded mapping area, which is expanded by a preset range on the basis of the target grid to which the stationary object is mapped, and calculate the occupancy probability parameter by adding the occupancy information with the first value to each of the grids constituting the expanded mapping area, in order to monitor the surrounding environment of the vehicle. The preset range expanded from the target grid may be defined in advance by a designer, in consideration of the similarity (distance resolution and speed resolution) between the signal waveforms.

FIG. 14 illustrates results obtained when the radar sensor detects the same stationary object by transmitting radar signals with a single waveform and multiple waveforms. After the expanded mapping area expanded by the present range from the target grid is set, the reduction in the probability that the stationary object will be detected may be removed even in the case of the multiple waveforms, through the following method of calculating the occupancy probability parameter for each of the grids constituting the expanded mapping area.

4. Occupancy Probability Parameter Calculation

The process of calculating the occupancy probability parameter of the grid map in the present embodiment follows an occupancy probability calculation method of a general OGM (Occupancy Grid Map) based on Equation 5 below.

$$l_t(i, j \mid R_{1:k}, V_{1:k}) = \log \frac{p(i, j \mid R_{1:k}, V_{1:k})}{1 - p(i, j \mid R_{1:k}, V_{1:k})} \quad \text{Log odd ratio} \qquad \text{[Equation 5]}$$

$$l_t(i, j \mid R_{1:k}, V_{1:k}) =$$

$$l_{t-1}(i, j \mid R_{1:k-1}, V_{1:k-1}) + \log \frac{p(i, j \mid R_k, V_k)}{1 - p(i, j \mid R_k, V_k)} - l_0$$

$$p(i, j \mid R_{1:k}, V_{1:k}) = 1 - \frac{1}{1 + \exp(l_t(i, j \mid R_{1:k}, V_{1:k}))}$$

In Equation 5, $R_{1:k}$ represents the sensing data (the above-described object information) of the sensor unit 100 (radar sensor) from the first frame to the $K^{th}$ frame, and $V_{1:k}$ represents the behavior data (the above-described behavior information) of the vehicle from the first frame to the $K^{th}$ frame, and 10 represents a prior probability (0 in the present embodiment).

When the occupancy information Pmap (i, j, k) added to each of the grids in the present embodiment is applied to the occupancy probability calculation method based on Equation 5 above, an occupancy probability parameter p is calculated according to Equation 6 below.

$$p(i, j \mid R_{1:k}, V_{1:k}) = \frac{1}{M} \sum_{m=k-M+1}^{k} P_{map}(i, j, m) \qquad \text{[Equation 6]}$$

In Equation 6, M represents the number of frames to be monitored.

5. Grid Map Update Error Correction

The speed, moving displacement, and yaw-axis angle change of the vehicle, which serve as factors for determining whether the update condition of the grid map is satisfied, are acquired by the sensors applied to the vehicle. Since such sensing values inevitably contain an error, it may be determined that the update condition of the grid map has been satisfied even though the update condition of the grid map was not actually satisfied, due to the error contained in the sensing values. In this case, the grid map may be falsely updated. As described above, during the update process for the grid map, the control unit 200 operates to change the index of the target grid to which the stationary object is mapped. Thus, when the grid map is falsely updated, an error may occur between the index corresponding to the actual location of the stationary object and the index of the stationary object mapped to the falsely updated grid map. As a result, the error may cause false detection and missing detection for the stationary object.

The occurrence of the error will be described with reference to FIGS. 15A to 15D. FIG. 15A illustrates that a stationary object is mapped to a grid ① in the $(K-1)^{th}$ frame, and then the grid ① is expanded by a preset range to decide a first expanded mapping area, and FIG. 15B illustrates that the update condition of the above-described grid map is satisfied in the $K^{th}$ frame, such that the grid map is updated. Since the grid map has been updated, the index of the grid to which the stationary object is mapped is also changed, so that the grid to which the stationary object is mapped is updated into a grid ②. Furthermore, the location of the stationary object, which has been actually detected by the sensor unit 100, is still maintained at the grid ①. As a result, an error occurs between the index of the grid corresponding to the actual location of the stationary object and the index of the grid of the stationary object mapped to the updated grid map.

When the grid map is updated as the $(K-1)^{th}$ frame is switched to the $K^{th}$ frame, the control unit 200 may correct the respective occupancy probability parameters of the grids constituting a second expanded mapping area through a method of comparing the first expanded mapping area in the $(K-1)^{th}$ frame to the second expanded mapping area in the $K^{th}$ frame, thereby correcting the above-described update error.

Referring to FIG. 15C, the control unit 200 may specify a first area composed of grids whose occupancy probability parameters have increased, among the grids of the second expanded mapping area, on the basis of the $K^{th}$ frame over the $(K-1)^{th}$ frame. That is, the first area corresponds to grids which were not occupied in the $(K-1)^{th}$ frame, but are occupied in the $K^{th}$ frame. Furthermore, the control unit 200 may specify a second area composed of grids whose occupancy probability parameters have decreased, among the grids of the first expanded mapping area, on the basis of the $K^{th}$ frame over the $(K-1)^{th}$ frame. That is, the second area corresponds to grids which were occupied in the $(K-1)^{th}$ frame, but are not occupied in the $K^{th}$ frame. Furthermore, the control unit 200 may correct the respective occupancy probability parameters of the grids constituting the second expanded mapping area in the $K^{th}$ frame by substituting the occupancy probability parameters of the second area with the occupancy probability parameters of the first area. Thus, as illustrated in FIG. 15D, the expanded mapping area may be configured while being matched with the location of the stationary object, which is actually detected by the sensor unit 100. When the state in which the grids constituting the second area are not occupied lasts for a preset time, the occupancy probability parameters of the grids may be reset to '0'.

FIG. 16A illustrates an example of an occupancy probability parameter on the grid map before an update error of the grid map is updated. As described in FIG. 16A, a grid ① corresponds to a location having horizontal/longitudinal errors from the actual location of a stationary object, but remains with a predetermined occupancy probability value, and a grid ② corresponds to the actual location of the stationary object, but has a lower occupancy probability value than surrounding grids, because the grid ② is a newly occupied grid.

Figure 16B:
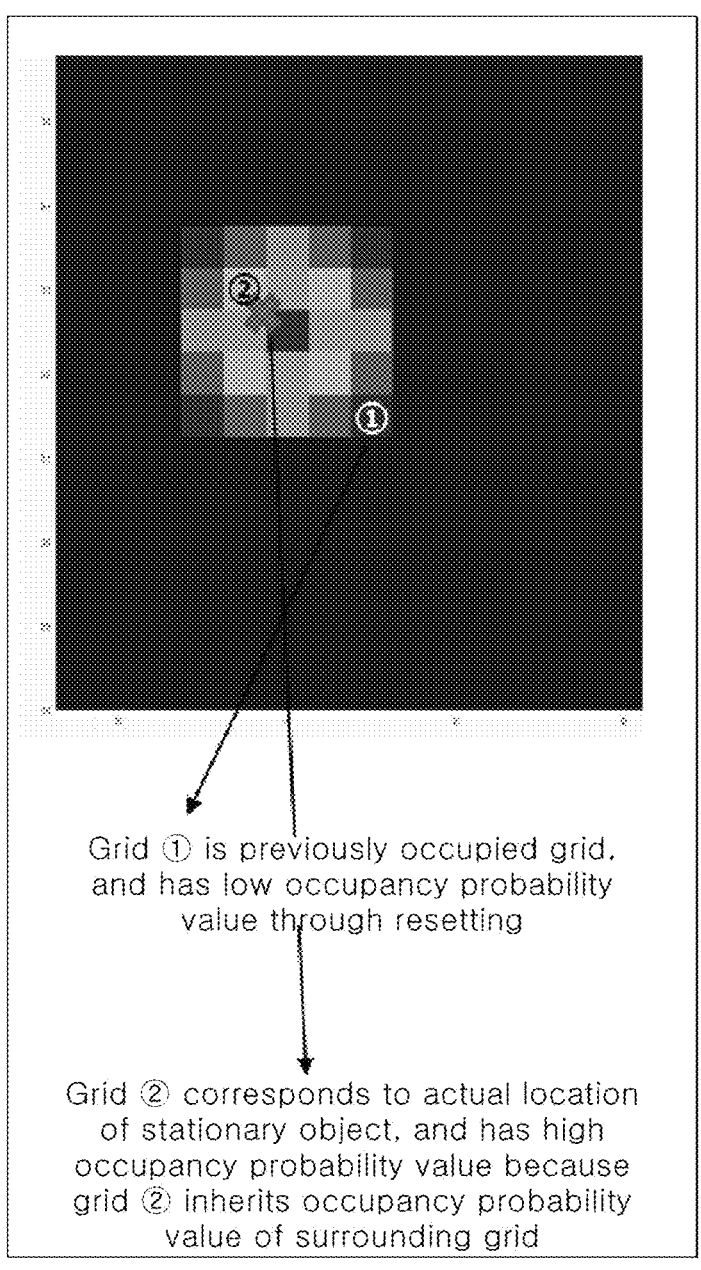

FIG. 16B illustrates an example of the occupancy probability parameter on the grid map after an update error of the grid map is corrected. As described in FIG. 16B, a grid ① is a previously occupied grid, and has a low occupancy probability value through resetting, and a grid ② corresponds to the actual location of a stationary object, and has a higher occupancy probability value than surrounding grids because the grid ② is a newly occupied grid, but inherits a predetermined occupancy probability value.

6. Correction for Shaded Area

Figure 17:
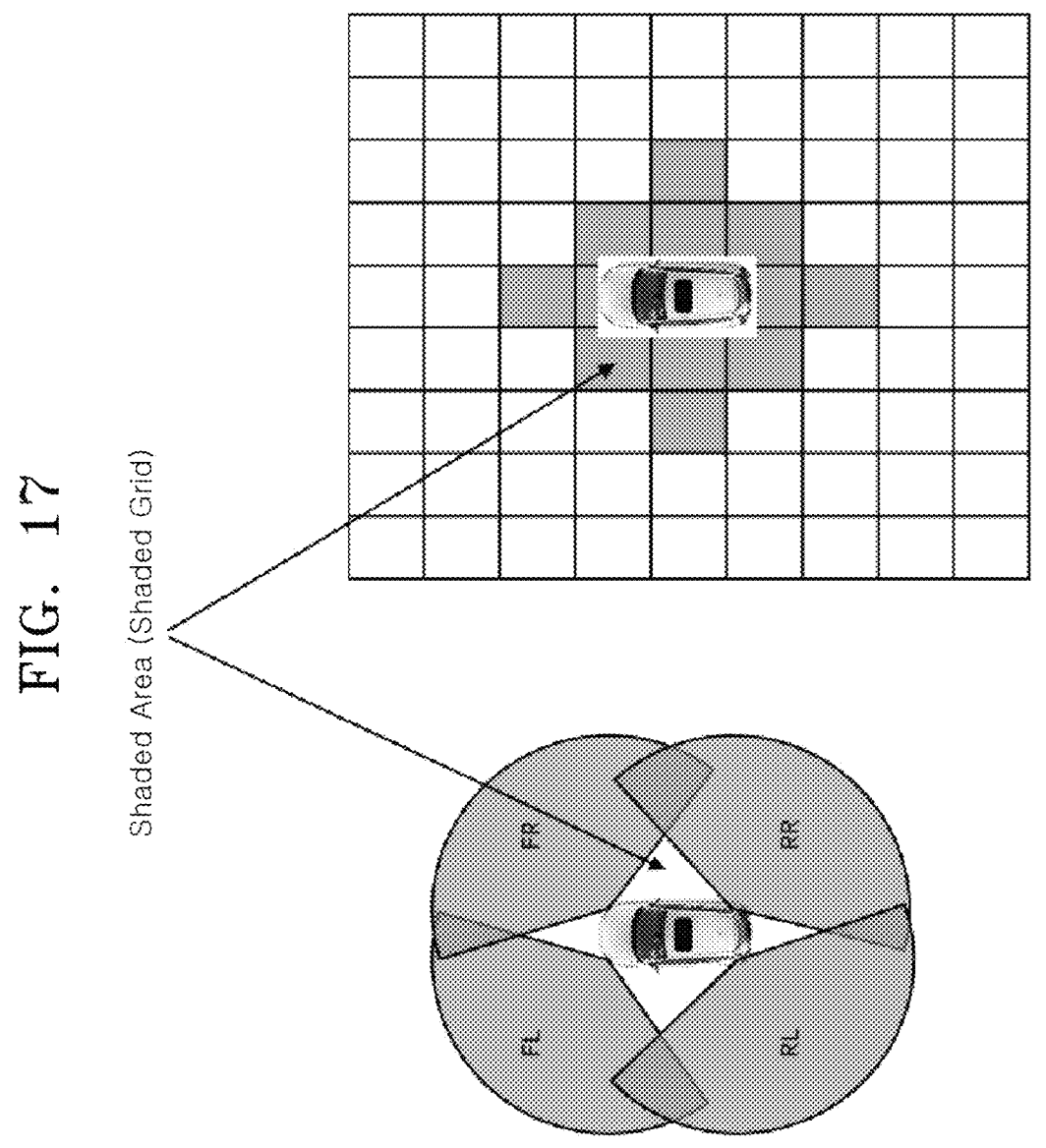

As described above, the detection sensor in accordance with the present embodiment may be implemented as a radar sensor. As illustrated in FIG. 17, a shaded area where the radar sensor cannot detect an outside object occurs due to the FoV and mounting characteristics (mounting angle and position) of the radar sensor.

In order to correct a shaded grid corresponding to the shaded area, the control unit 200 may operate to correct the shaded grid by using a first method of receiving an occupancy probability parameter in the $(K-1)^{th}$ frame or a second method of receiving an occupancy probability parameter of a grid around the shaded grid.

Figure 18:
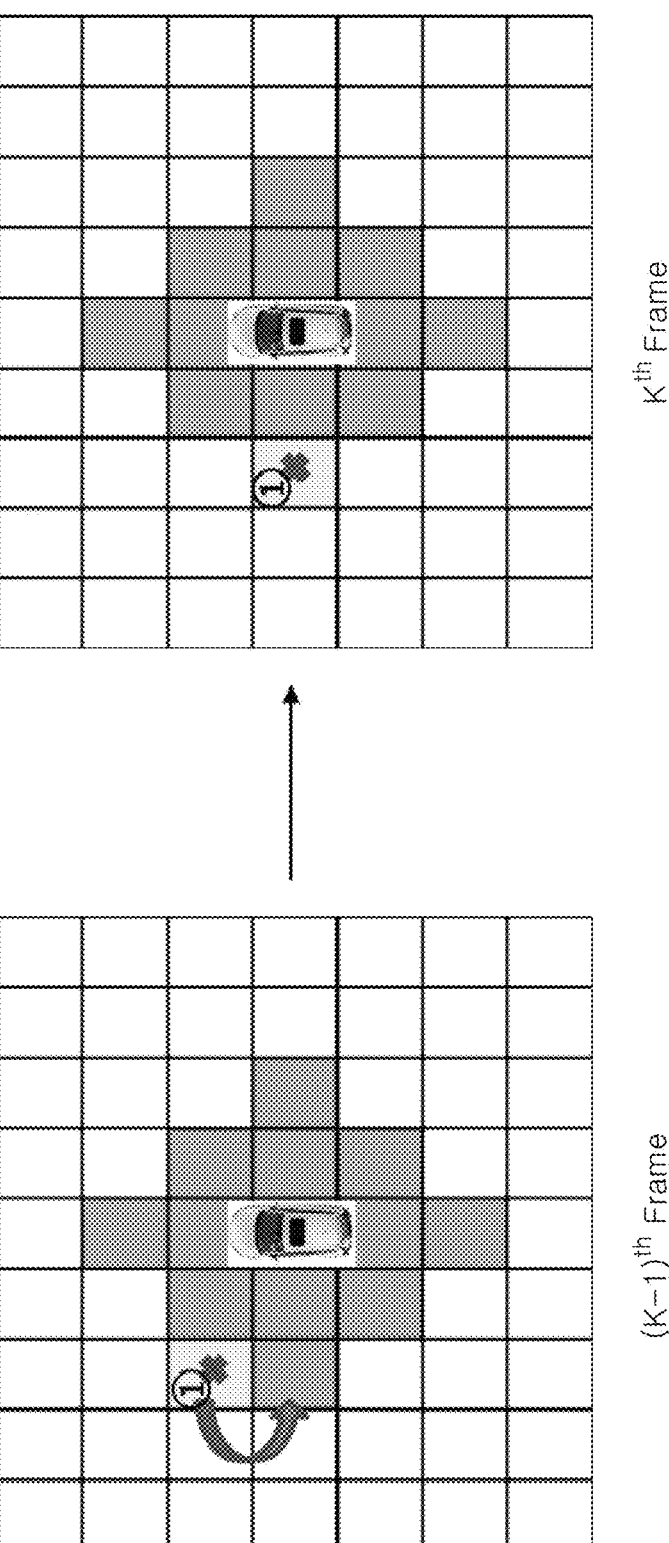

The first method may be performed when the speed of the vehicle is equal to or higher than a preset reference value. As illustrated in FIG. 18, a grid ① in the $(K-1)^{th}$ frame does not correspond to a shaded grid, and thus retains with an occupancy probability parameter. When the vehicle speed is equal to or higher than the reference value, the update process for the grid map is performed, and the grid ① in the $K^{th}$ frame belongs to the shaded grids. In this case, the control unit 200 may set the occupancy probability parameter of the grid ① in the $(K-1)^{th}$ frame to the occupancy probability parameter of the shaded grid ① in the $K^{th}$ frame, thereby minimizing a loss caused by missing detection of the radar sensor.

Figure 19:
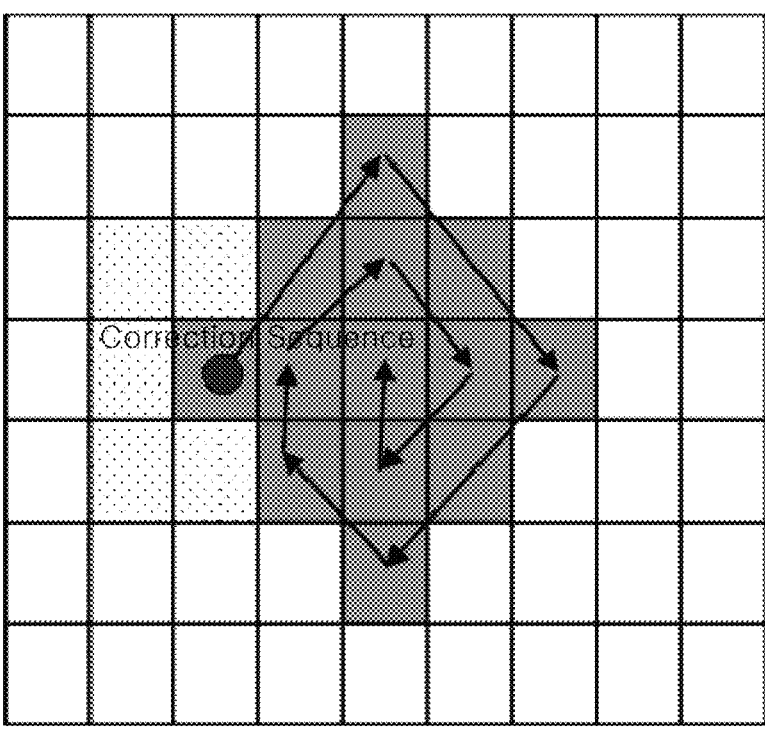

The second method may be performed when the speed of the vehicle is lower than the reference value. That is, when the vehicle travels at a very low speed or is stopped, the grid map is not updated even though the $(K-1)^{th}$ frame is switched to the $K^{th}$ frame. Thus, the first method cannot be applied. In this case, the control unit 200 may operate to set the occupancy probability parameter of a grid around a shaded grid to the occupancy probability parameter of the shaded grid. In this case, as illustrated in FIG. 19, the control unit 200 may perform the second method from a shaded grid located at the outermost position, in order to acquire the occupancy probability parameter of a grid which is not the shaded grid. The control unit 200 may set the highest occupancy probability parameter, among the occupancy probability parameters of grids located within a preset range (e.g. one grid) from the shaded grid, to the occupancy probability parameter of the corresponding shaded grid. FIGS. 20A and 20B show a result obtained by setting an occupancy probability parameter with a predetermined value to a shaded grid through the correction for the shaded area.

7. Stationary Object Location Decision (Peak Detection)

When the update of the grid map, the decision of the expanded mapping area, the update error correction, and the shaded area correction are performed through the above-described processes, the control unit 200 may operate to specify the grid at which the stationary object is highly likely to be located, on the basis of the occupancy probability parameters of the grids within the expanded mapping area.

That is, the control unit 200 may decide a peak grid having the highest occupancy probability parameter among the grids within the expanded mapping area decided for a plurality of frames to be monitored. When the occupancy probability parameter of the peak grid is equal to or larger than a threshold value defined for the peak grid, the control unit 200 may determine that the stationary object is located at the peak grid. The control unit 200 may monitor the surrounding environment of the vehicle by repeatedly performing the stationary object location decision method based on the 'peak detection', while the vehicle travels.

FIG. 21 is a flowchart for describing a method for monitoring the surrounding environment of a vehicle in accordance with an embodiment of the present disclosure. The method for monitoring the surrounding environment of a vehicle in accordance with the present embodiment will be described with reference to FIG. 21. Hereafter, the descriptions of contents overlapping the above-described contents will be omitted herein, and the following descriptions will be focused on a time series configuration.

First, the control unit 200 extracts a stationary object among objects outside the vehicle, detected by the sensor unit 100, by using the behavior information of the vehicle, in step S100.

Then, the control unit 200 maps the stationary object extracted in step S100 to a preset grid map, adds occupancy information to each of grids constituting the grid map according to whether the stationary object is mapped to the grid map, and calculates an occupancy probability parameter from the occupancy information added to the grids within the grid map in a plurality of frames to be monitored, the occupancy probability parameter indicating the probability that the stationary object will be located at the corresponding grid, in step S200.

In step S200, the control unit 200 maps the stationary object to the grid map while updating the grid map by changing the respective indexes of the grids constituting the grid map according to the behavior information of the vehicle.

Furthermore, in step S200, the control unit 200 converts the location information of the stationary object into an index corresponding to the grid map, maps the stationary object to the grid map by specifying a target grid of the grid map, corresponding to the index, adds occupancy information with a first value to the target grid to which the stationary object is mapped, and adds occupancy information with a second value to the other grids, the second value being smaller than the first value.

Furthermore, in step S200, the control unit 200 calculates an occupancy probability parameter by deciding an expanded mapping area expanded by a preset range on the basis of the target grid to which the stationary object is mapped, and adding the occupancy information with the first value to each of grids constituting the expanded mapping area.

Furthermore, in step S200, the control unit 200 corrects the occupancy probability parameters of grids constituting a second expanded mapping area by comparing a first expanded mapping area in the $(K-1)^{th}$ frame to the second expanded mapping area in the $K^{th}$ frame, when the grid map is updated as the $(K-1)^{th}$ frame is switched to the $K^{th}$ frame. Specifically, the control unit 200 specifies a first area composed of grids whose occupancy probability parameters have increased, among the grids of the second expanded mapping area, and a second area composed of grids whose occupancy probability parameters have decreased, among the grids of the first expanded mapping area, on the basis of the $K^{th}$ frame over the $(K-1)^{th}$ frame. Then, the control unit 200 corrects the respective occupancy probability parameters of the grids constituting the second expanded mapping area in the $K^{th}$ frame by substituting the occupancy probability parameters of the second area with the occupancy probability parameters of the first area.

Furthermore, in step S200, the control unit 200 corrects a shaded grid corresponding to a shaded area where the sensor unit 100 cannot detect an outside object in the $K^{th}$ frame, by using a first method of receiving an occupancy probability parameter in the $(K-1)^{th}$ frame or a second method of receiving an occupancy probability parameter of a grid around the shaded grid. In this case, the control unit 200 corrects the shaded grid according to the first method when the speed of the vehicle is equal to or higher than a preset reference value, and corrects the shaded grid according to the second method when the speed of the vehicle is lower than the reference value.

After step S200, the control unit 200 monitors the surrounding environment of the vehicle on the basis of the occupancy probability parameter calculated in step S200, in step S300. Specifically, the control unit 200 decides a peak grid having the highest occupancy probability parameter among the grids within the expanded mapping area decided for a plurality of frames to be monitored. When the occupancy probability parameter of the peak grid is equal to or larger than a threshold value defined for the peak grid, the control unit 200 determines that the stationary object is located at the peak grid.

As such, the apparatus and method for monitoring the surrounding environment of a vehicle in accordance with the present embodiment may map a stationary object detected through the radar to the preset grid map, add occupancy information to each of the grids constituting the grid map depending on whether the stationary object is mapped to the grid map, and then calculate the occupancy probability parameter from the occupancy information added to each of the grids within the grid map in a plurality of frames to be monitored, the occupancy probability parameter indicating that the probability that the stationary object will be located at the corresponding grid, in order to monitor the surrounding environment of the vehicle. Thus, the apparatus and method can improve the detection accuracy for the outside object when monitoring the surrounding environment of the vehicle through the radar.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device. The processor also includes a communication device, such as a computer, cellular phone, PDA (Personal Digital Assistant) and another device, which facilitates information communication between end users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

The controller, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner. In an example, the processor also includes a communication device, such as a computer, cellular phone, PDA (Personal Digital Assistant) and another device, which facilitates information communication between end users.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method described herein. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An apparatus for monitoring a surrounding environment of a vehicle, comprising:

a plurality of detection sensors configured to detect an object outside the vehicle according to a frame at a predefined period; and a controller configured to extract a stationary object from among one or more objects detected by the detection sensors, to map the stationary object to a grid map, to calculate an occupancy probability parameter indicative of a probability that the stationary object will be located on a grid of the grid map, and to monitor the surrounding environment of the vehicle based on the occupancy probability parameter by comparing the occupancy probability parameter with a threshold value defined in the grid of the grid map, wherein the threshold value for each grid is set differently depending on an object detection probability that is determined based on at least one of an intensity of a signal received by the detection sensors, how many times the object is detected within the frame, and whether the object is redundantly detected through two adjacent detection sensors such that the threshold value is set to different values for an independent area, a single-overlap area, and a multi-overlap area within the grid map, the controller being configured to distinguish between a moving object and the stationary object based on a speed of the vehicle and longitudinal and horizontal speeds of the one or more objects, and to extract only the stationary object from among the one or more objects detected by the detection sensors, wherein the grid map has a size corresponding to the surrounding environment area of the vehicle and longitudinal and horizontal axes of the grid map are set based on the vehicle, wherein the controller is configured to map the stationary object to the grid map while updating the grid map by changing an index of each grid constituting the grid map according to behavior information of the vehicle, wherein the controller is configured to update the grid map from a (K−1)th frame to a Kth frame when a predefined grid map update condition is satisfied according to a longitudinal movement distance or a transverse movement distance of the vehicle, wherein the controller performs:

when the speed of the vehicle is equal to or higher than a preset reference value, a first operation in which the controller sets the occupancy probability parameter for the grid of the grid map in the (K−1)th frame to an occupancy probability parameter for a shaded grid of the grid map in the Kth frame, and when the speed of the vehicle is lower than the preset reference value, a second operation in which the controller sets a highest occupancy probability parameter, among the occupancy probability parameters of grids located within a preset range from a shaded grid of the grid map in the Kth frame, to an occupancy probability parameter of the shaded grid, wherein the shaded grid is a grid corresponding to a shaded area where the plurality of detection sensors cannot detect an outside object, wherein the independent area has a first threshold value and is defined as an area in the grid map sensed by a first detection sensor in the $K^{th}$ frame, wherein the single overlap area has a second threshold value and is defined as an area in the grid map in which an area sensed by the first detection sensor overlaps the independent area in a $(K+1)^{th}$ frame following the $K^{th}$ frame, and wherein the multiple overlap area has a third threshold value and is defined as an area in the grid map in which an area sensed by a second detection sensor adjacent to the first detection sensor overlaps the single overlap area in the $K^{th}$ frame or the $(K+1)^{th}$ frame.

2. The apparatus according to claim 1, wherein the grid map update condition is a condition in which the longitudinal movement distance of the vehicle is greater than a longitudinal size of the grid or the transverse movement distance of the vehicle is greater than a transverse size of the grid.

3. The apparatus according to claim 1, wherein the controller is configured to update the grid map by changing an index of each grid in the $(K-1)^{th}$ frame with respect to the $K^{th}$ frame based on the longitudinal movement distance, the transverse movement distance, and a longitudinal angle change of the vehicle.

4. The apparatus according to claim 3, wherein the controller is configured to update the grid map using a rotation matrix that rotates the grid map according to the longitudinal movement distance and the transverse movement distance of the vehicle from the $(K-1)^{th}$ frame to the $K^{th}$ frame, the index of each grid in the $(K-1)^{th}$ frame, and a yaw rate of the vehicle.

5. The apparatus according to claim 1, wherein the controller is configured to convert location information of the stationary object into an index corresponding to the grid map, and to map the stationary object to the grid map by specifying a target grid of the grid map corresponding to the index.

6. The apparatus according to claim 5, wherein the controller is configured to add occupancy information with a first value to the target grid to which the stationary object is mapped, and to add occupancy information with a second value to the remaining grids, the second value being smaller than the first value.

7. The apparatus according to claim 6, wherein the controller is configured to determine an expanded mapping area expanded by a set range with respect to the target grid to which the stationary object is mapped, and to monitor the surrounding environment of the vehicle by adding the occupation information with the first value to each grid constituting the expanded mapping area to calculate the occupation probability parameter.

8. The apparatus according to claim 7, wherein the set range is defined according to distance and speed resolutions of signal waveforms transmitted from the detection sensors.

9. The apparatus according to claim 1, wherein the controller is configured to update the grid map according to whether a grid map update condition is satisfied when switching from a $(K-1)^{th}$ frame to a $K^{th}$ frame, while correcting a grid map update error due to an error inherent in a factor for determining whether the grid map update condition is satisfied.

10. The apparatus according to claim 9, wherein, when the grid map update error is corrected as the grid map is updated by switching from the $(K-1)^{th}$ frame to the $K^{th}$ frame, the controller is configured to compare a first expanded mapping area extended by a set range with respect to the target grid to which the stationary object is mapped in the $(K-1)^{th}$ frame with a second expanded mapping area extended by a set range with respect to the target grid to which the stationary object is mapped in the $K^{th}$ frame to correct an occupancy probability parameter of each grid constituting the second expanded mapping area.

11. The apparatus according to claim 10, wherein the controller is configured to specify a first area composed of grids with increased occupancy probability parameters, among the grids of the second expanded mapping area, with respect to the $K^{th}$ frame compared to the $(K-1)^{th}$ frame, to specify a second area composed of grids with decreased occupancy probability parameters, among the grids of the first expanded mapping area, and to replace the occupancy probability parameters of the second area with the occupation probability parameters of the first area to correct the occupancy probability parameter of each of the grids constituting the second expanded mapping area.

12. The apparatus according to claim 1, wherein the controller is configured to determine a peak grid with a maximum occupancy probability parameter among the grids in the grid map, and to determine that the stationary object is located on the peak grid when the occupancy probability parameter of the peak grid is equal to or greater than a threshold value defined for the peak grid.

13. A method of monitoring a surrounding environment of a vehicle, comprising:

extracting, by a controller, a stationary object from among one or more objects, outside the vehicle, detected by a plurality of detection sensors configured to detect the objects according to a frame at a predefined period, the controller being configured to distinguish between a moving object and the stationary object based on a speed of the vehicle and longitudinal and horizontal speeds of the one or more objects, and to extract only the stationary object from among the one or more objects detected by the detection sensors;

mapping, by the controller, the stationary object to a grid map and calculating, by the controller, an occupancy probability parameter indicative of a probability that the stationary object will be located on a grid of the grid map from a result of mapping; and monitoring, by the controller, the surrounding environment of the vehicle based on the occupancy probability parameter by comparing the occupancy probability parameter with a threshold value defined in the grid of the grid map, wherein the threshold value for each grid is set differently depending on an object detection probability that is determined based on at least one of an intensity of a signal received by the detection sensors, how many times the object is detected within the frame, and whether the object is redundantly detected through two adjacent detection sensors such that the threshold value is set to different values for an independent area, a single-overlap area, and a multi-overlap area within the grid map, wherein the grid map has a longitudinal axis, a transverse axis, and an index set with respect to the vehicle, the grid map has a size corresponding to the surrounding environment area of the vehicle and the longitudinal and transverse axes of the grid map are set based on the vehicle, in the calculating, by the controller, the occupancy probability parameter, the control unit maps the stationary object to the grid map while updating the grid map by changing an index of each grid constituting the grid map according to behavior information of the vehicle, wherein the method further comprises:

updating, by the controller, the grid map from a (K−1)th frame to a Kth frame when a predefined grid map update condition is satisfied according to a longitudinal or transverse movement distance of the vehicle, when the speed of the vehicle is equal to or higher than a preset reference value, performing a first operation in which the controller sets the occupancy probability parameter for the grid of the grid map in the (K−1)th frame to an occupancy probability parameter for a shaded grid of the grid map in the Kth frame, and when the speed of the vehicle is lower than the preset reference value, performing a second operation in which the controller sets a highest occupancy probability parameter, among the occupancy probability parameters of grids located within a preset range from a shaded grid of the grid map in the Kth frame, to an occupancy probability parameter of the shaded grid, wherein the shaded grid is a grid corresponding to a shaded area where the plurality of detection sensors cannot detect an outside object, wherein the independent area has a first threshold value and is defined as an area in the grid map sensed by a first detection sensor in the $K^{th}$ frame, wherein the single overlap area has a second threshold value and is defined as an area in the grid map in which an area sensed by the first detection sensor overlaps the independent area in a $(K+1)^{th}$ frame following the $K^{th}$ frame, and wherein the multiple overlap area has a third threshold value and is defined as an area in the grid map in which an area sensed by a second detection sensor adjacent to the first detection sensor overlaps the single overlap area in the $K^{th}$ frame or the $(K+1)^{th}$ frame.

14. An apparatus for monitoring a surrounding environment of a vehicle, comprising:

a sensor unit comprising a plurality of detection sensors configured to detect an object outside the vehicle according to a frame at a predefined period; and a controller configured to extract a stationary object from among the one or more objects detected by the detection sensors, to map the stationary object to a grid map, to calculate an occupancy probability parameter indicative of a probability that the stationary object will be located on a grid of the grid map, and to monitor the surrounding environment of the vehicle by comparing the occupancy probability parameter with a threshold value defined in the grid of the grid map, wherein the threshold value for each grid is set differently depending on an object detection probability that is determined based on at least one of an intensity of a signal received by the sensor unit, how many times the object is detected within the frame, and whether the object is redundantly detected through two adjacent detection sensors such that the threshold value is set to different values for an independent area, a single-overlap area, and a multi-overlap area within the grid map, the controller being configured to distinguish between a moving object and the stationary object based on a speed of the vehicle and longitudinal and horizontal speeds of the one or more objects, and to extract only the stationary object from among the one or more objects detected by the detection sensors, wherein the grid map has a size corresponding to the surrounding environment area of the vehicle and longitudinal and horizontal axes of the grid map are set based on the vehicle, wherein the threshold value is defined for each of a plurality of areas in the grid map divided according to whether detection areas overlap each other in each frame for the same detection sensor and whether detection areas overlap each other in the same frame for two adjacent detection sensors, wherein the controller is configured to update the grid map from a (K−1)th frame to a Kth frame when a predefined grid map update condition is satisfied according to a longitudinal movement distance or a transverse movement distance of the vehicle, wherein the controller performs:

when the speed of the vehicle is equal to or higher than a preset reference value, a first operation in which the controller sets the occupancy probability parameter for the grid of the grid map in the (K−1)th frame to an occupancy probability parameter for a shaded grid of the grid map in the Kth frame, and when the speed of the vehicle is lower than the preset reference value, a second operation in which the controller sets a highest occupancy probability parameter, among the occupancy probability parameters of grids located within a preset range from a shaded grid of the grid map in the Kth frame, to an occupancy probability parameter of the shaded grid, wherein the shaded grid is a grid corresponding to a shaded area where the plurality of detection sensors cannot detect an outside object, wherein the independent area has a first threshold value and is defined as an area in the grid map sensed by a first detection sensor in the $K^{th}$ frame, wherein the single overlap area has a second threshold value and is defined as an area in the grid map in which an area sensed by the first detection sensor overlaps the independent area in a $(K+1)^{th}$ frame following the $K^{th}$ frame, and wherein the multiple overlap area has a third threshold value and is defined as an area in the grid map in which an area sensed by a second detection sensor adjacent to the first detection sensor overlaps the single overlap area in the $K^{th}$ frame or the $(K+1)^{th}$ frame.

15. The apparatus according to claim 14, wherein the threshold value is determined by a radar equation in response to a strength of a received signal input to the sensor unit.

16. The apparatus according to claim 14, wherein each of the first, second, and third threshold values has a linear section, which is a section that linearly increases in response to the strength of the received signal input to the sensor unit, and a relationship of "first threshold value<second threshold value<third threshold value" is established in a section in which the respective linear sections of the first, second, and third threshold values overlap each other.

* * * * *